US012731234B2

(12) United States Patent
Xu et al.

(10) Patent No.: US 12,731,234 B2
(45) Date of Patent: Sep. 8, 2026

(54) SYSTEM AND METHOD FOR ANALYZING COMPRESSED VIDEO

(71) Applicant: Centre for Intelligent Multidimensional Data Analysis Limited, Pak Shek Kok (HK)

(72) Inventors: Qiang Xu, Pak Shek Kok (HK); Hong Yan, Pak Shek Kok (HK)

( * ) Notice: Subject to any disclaimer, the term of this patent is extended or adjusted under 35 U.S.C. 154(b) by 718 days.

(21) Appl. No.: 18/155,353

(22) Filed: Jan. 17, 2023

(65) Prior Publication Data

US 2024/0242320 A1 Jul. 18, 2024

(51) Int. Cl.
*G06T 7/00* (2017.01)
*H04N 19/154* (2014.01)

(52) U.S. Cl.
CPC ......... *G06T 7/0002* (2013.01); *H04N 19/154* (2014.11); *G06T 2207/10016* (2013.01); *G06T 2207/20081* (2013.01); *G06T 2207/30168* (2013.01)

(58) Field of Classification Search
CPC ......... G06T 7/0002; G06T 2207/10016; G06T 2207/20081; G06T 2207/30168; H04N 19/154
USPC .......................................................... 382/155
See application file for complete search history.

(56) References Cited

PUBLICATIONS

Xu, Qiang, et al. "Detecting double H. 266/VVC compression with the same coding parameters." Neurocomputing 514 (2022): 231-244. (Year: 2022).*

Jiang, Xinghao, et al. "Detection of double compression with the same coding parameters based on quality degradation mechanism analysis." IEEE Transactions on Information Forensics and Security 13.1 (2017): 170-185. (Year: 2017).*

Q. Xu, D.M. Xu, H. Wang, Z.J. Mi, Z. Wang and H. Yan, "Detecting double H.266/VVC compression with the same coding parameters," Neurocomputing, 2022.

J.Y. Chen, X.H. Jiang, T.F. Sun, P.S. He, and S.L. Wang, "Detecting double MPEG compression with the same quantiser scale based on MBM feature," in 2016 IEEE International Conference on Acoustics, Speech and Signal Processing (ICASSP). IEEE, 2016, pp. 2064-2068.

X. Jiang, P. He, T. Sun, F. Xie, and S. Wang, "Detection of double compression with the same coding parameters based on quality degradation mechanism analysis," IEEE Transactions on Information Forensics and Security, vol. 13, No. 1, pp. 170-185, 2018.

X. Jiang, Q. Xu, T. Sun, B. Li and P. He, "Detection of HEVC Double Compression with the same coding parameters based on analysis of intra coding quality degradation process," IEEE Transactions on Information Forensics and Security, vol. 15, pp. 250-263, 2020.

Q. Xu, X. Jiang, T. Sun, and A. C. Kot, "Detection of HEVC double compression with non-aligned GOP structures via inter-frame quality degradation analysis," Neurocomputing, vol. 452, pp. 99-113, 2021.

(Continued)

*Primary Examiner* — Jonathan S Lee
(74) *Attorney, Agent, or Firm* — Kimberly A. Peaslee

(57) ABSTRACT

A system and a method for analyzing compressed video. The system comprises a recompression detection engine arranged to analyze a raw video sequence and a compressed video sequence and to determine whether the compressed video has been processed by a predetermined video compression codec for multiple times using a same set of coding parameters.

16 Claims, 12 Drawing Sheets

(56) References Cited

PUBLICATIONS

D. Vazquez-Pad'in, M. Fontani, D. Shullani, F. Perez-Gonzalez, A. Piva, and M. Barni, "Video integrity verification and GOP size estimation via generalized variation of prediction footprint," IEEE Transactions on Information Forensics and Security, vol. 15, pp. 1815-1830, 2019.
Y. Yu, H. Yao, R. Ni, and Y. Zhao, "Detection of fake high definition for HEVC videos based on prediction mode feature," Signal Processing, vol. 166, p. 107, 2020.
H. Wang, J. Wang, X. Luo, Y. Zheng, B. Ma, J. Sun, and S.K. Jha, "Detecting aligned double JPEG compressed color image with same quantization matrix based on the stability of image," IEEE Transactions on Circuits and Systems for Video Technology, 2021.

* cited by examiner

| | | | | | | | |
|---|---|---|---|---|---|---|---|
| 1 | 1 | 6 | 6 | 11 | 7 | 7 | 11 |
| 1 | 1 | 6 | 6 | 11 | 7 | 7 | 11 |
| 2 | 2 | 2 | 2 | 11 | 7 | 7 | 11 |
| 2 | 2 | 2 | 2 | 11 | 7 | 7 | 11 |
| 6 | 6 | 2 | 2 | 1 | 1 | 2 | 2 |
| 2 | 2 | 2 | 2 | 1 | 1 | 2 | 2 |
| 2 | 2 | 2 | 2 | 2 | 2 | 5 | 5 |
| 6 | 6 | 2 | 2 | 2 | 2 | 5 | 5 |

SYSTEM AND METHOD FOR ANALYZING COMPRESSED VIDEO

TECHNICAL FIELD

The invention relates to a system and a method for analyzing compressed video, and particularly, although not exclusively, to a system and a method for detecting recompressed video.

BACKGROUND

An international video coding standard, the Versatile Video Coding (H.266/VVC) standard, may be used to serve an ever-growing need for improved video compression as well as to support a wider variety of today's media content and emerging applications. The new coding standard has introduced a series of new coding techniques, such as multi-type tree partitioning, Adaptive Loop Filtering (ALF) and so on, which may interfere with the feature extraction of existing detection methods.

The emergence of video editing tools may bring great convenience, however it may also have a negative impact on the authenticity and originality of digital video. Therefore, it may be worthwhile to apply passive video forensics method to detect video manipulation and editing.

SUMMARY OF THE INVENTION

In accordance with a first aspect of the present invention, there is provided a system for analyzing compressed video, comprising: a recompression detection engine arranged to analyze a compressed video sequence associated with a raw video sequence and to determine whether the compressed video has been processed by a predetermined video compression codec for multiple times using a same set of coding parameters.

In accordance with the first aspect, the predetermined video compression codec includes a Versatile Video Coding (H.266/VVC) compression standard.

In accordance with the first aspect, the recompression detection engine includes a machine-learning based processing engine.

In accordance with the first aspect, the recompression detection engine is trained by: obtaining multiple sets of positive samples of recompressed video sequence each represent the compressed video sequence which has been processed by the predetermined video compression codec for multiple times using the same set of coding parameters; obtaining multiple sets of negative samples of recompressed video sequence each represent the compressed video sequence which has been processed by the predetermined video compression codec once only; and providing the multiple sets of positive samples and negative samples of recompressed video sequence so as to train the recompression detection engine in a machine learning process.

In accordance with the first aspect, the recompressed video sequence is reprocessed by the predetermined video compression codec for at least once using the same set of coding parameters, after processing the raw video sequence with an initial compression and decompression cycle using the predetermined video compression codec and the same set of coding parameters.

In accordance with the first aspect, the raw video sequences decompressed video sequences obtained after at least one compression and decompression cycle include YUV sequences.

In accordance with the first aspect, during each decoding procedure in the compression and decompression cycle, statistics of coding unit (CU) partition and prediction modes from I-frames of the video is extracted, and wherein different CU partition modes and prediction mode statics for all coding units are labeled with a corresponding mode number.

In accordance with the first aspect, different CU partition modes consists of different number of 4×4 minimum units.

In accordance with the first aspect, during each decoding procedure after ith compression, minimum unit mapping and subunit prediction mapping are performed to facilitate feature construction, and wherein a difference of the number of 4×4 minimum units with the same label after two consecutive compressions is measured.

In accordance with the first aspect, during each decoding procedure after ith compression, prediction mode based feature set are further concatenated into a fusion feature for detection in the training process, wherein the prediction modes based feature set is obtained based on consistency ratios of adjacent prediction mode pairs in horizontal, vertical, major diagonal and minor diagonal directions after multiple compressions.

In accordance with a second aspect of the present invention, there is provided a method of analyzing compressed video, comprising the step of utilizing a recompression detection engine to analyze a compressed video sequence associated with a raw video sequence and to determine whether the compressed video has been processed by a predetermined video compression codec for multiple times using a same set of coding parameters.

In accordance with the second aspect, the predetermined video compression codec includes a Versatile Video Coding (H.266/VVC) compression standard.

In accordance with the second aspect, the recompression detection engine includes a machine-learning based processing engine.

In accordance with the second aspect, the method further comprises the step of training the recompression detection engine by: obtaining multiple sets of positive samples of recompressed video sequence each represent the compressed video sequence which has been processed by the predetermined video compression codec for multiple times using the same set of coding parameters; obtaining multiple sets of negative samples of recompressed video sequence each represent the compressed video sequence which has been processed by the predetermined video compression codec once only; and providing the multiple sets of positive samples and negative samples of recompressed video sequence so as to train the recompression detection engine in a machine learning process.

In accordance with the second aspect, the recompressed video sequence is reprocessed by the predetermined video compression codec for at least once using the same set of coding parameters, after processing the raw video sequence with an initial compression and decompression cycle using the predetermined video compression codec and the same set of coding parameters.

In accordance with the second aspect, the raw video sequences decompressed video sequence obtained after at least one compression and decompression cycle include YUV sequences.

In accordance with the second aspect, during each decoding procedure in the compression and decompression cycle, statistics of coding unit (CU) partition and prediction modes from I-frames of the video is extracted, and wherein different CU partition modes and prediction mode statics for all coding units are labeled with a corresponding mode number.

In accordance with the second aspect, different CU partition modes consists of different number of 4×4 minimum units.

In accordance with the second aspect, during each decoding procedure after ith compression, minimum unit mapping and subunit prediction mapping are performed to facilitate feature construction, and wherein a difference of the number of 4×4 minimum units with the same label after two consecutive compressions is measured.

In accordance with the second aspect, during each decoding procedure after ith compression, prediction mode based feature set are further concatenated into a fusion feature for detection in the training process, wherein the prediction modes based feature set is obtained based on consistency ratios of adjacent prediction mode pairs in horizontal, vertical, major diagonal and minor diagonal directions after multiple compressions.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENTS

The inventors devised that although some examples work well when the parameters of double compression are inconsistent, the inventors found that when the video undergoes double compression with the same coding parameters, the detection would be more difficult. The reason is that when the same encoding parameters are used for video recompression, the difference between the coded videos is weaker than that of the recompression with different parameters, and the recompression traces are much more inconspicuous in this case.

In addition, some example cannot be directly applied to High Efficiency Video Coding (H.265/HEVC) videos due to the upgrade of the block partitioning modes, thus additional features, such as Intra Prediction Unit Prediction Mode (IPUPM) may be adopted to evaluate the block stability. By calculating the variation rates of PUs, experimental results demonstrate the effectiveness of the algorithm for H.265/HEVC double compression detection.

In according to different aspects of the invention, the inventors devised a system and a method for detecting H.266/VVC double compression. Preferably, the inventors contributed in the following aspects. They studied the new problem of video double compression detection for H.266/VVC standard by leveraging modes analysis in the coding domain. They calculated the variation of partition modes and consistency of prediction modes of coding units after consecutive compressions and decompressions to characterize the double compression traces. The variation in the number of coding units (CUs) with different partition modes in each compression and the consistency ratios of adjacent prediction mode pairs in four directions are calculated to form the detection feature. Minimum Unit Mapping (MUM) and Subunit Prediction Mapping (SPM) are designed to facilitate the feature construction. MUM is used to reduce the interference of quadtree or multi-type tree partition to mode analysis and SPM is adopted so that the number of adjacent prediction mode pairs in different directions can be calculated more accurately. Extensive experiments are performed. A wide variety of scenarios and parameter settings are introduced to evaluate the effectiveness and robustness of the method comprehensively.

Figure 1:
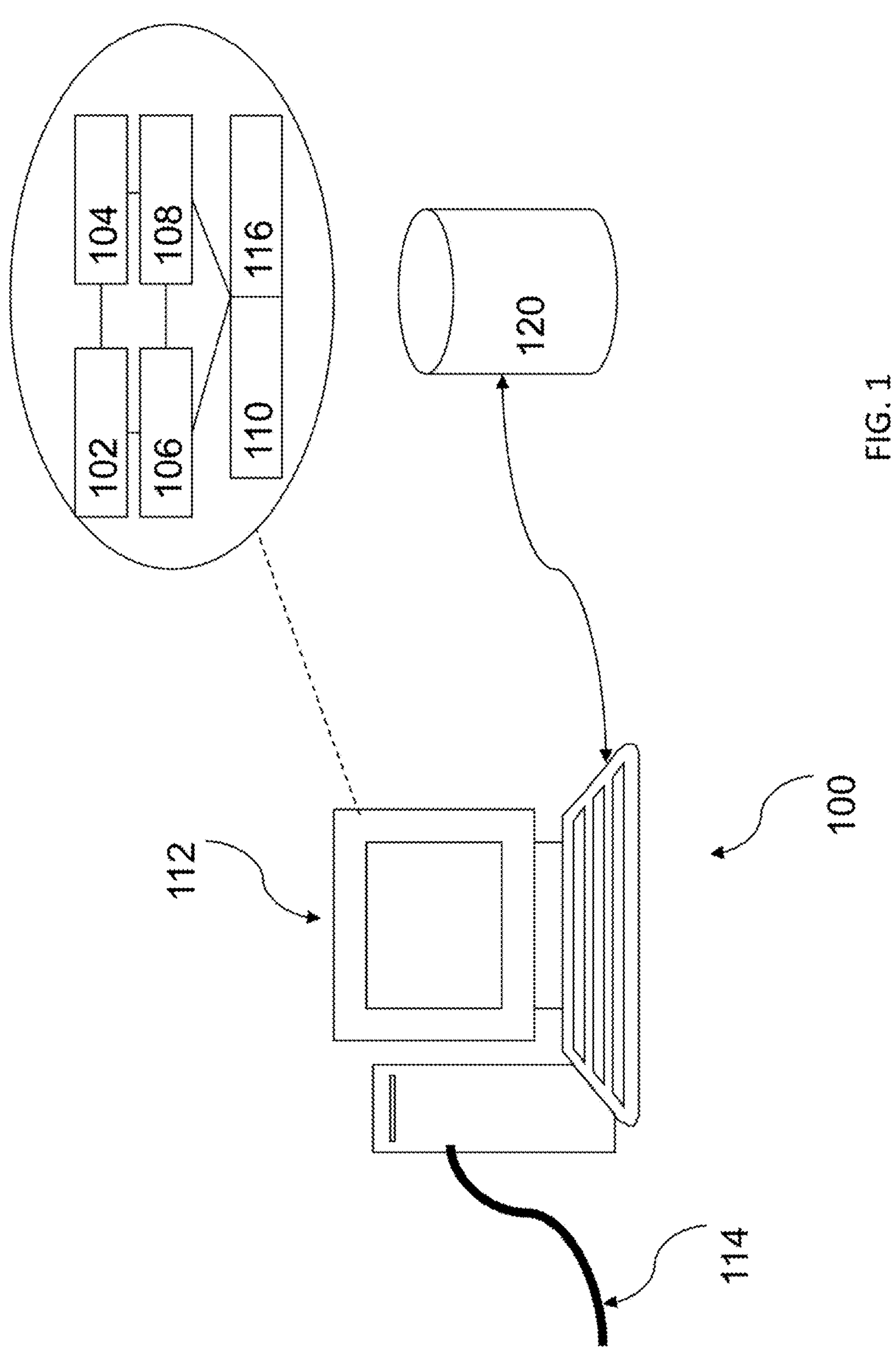
FIG. 1 is a schematic diagram of a computer server which is arranged to be implemented as system for analyzing compressed video in accordance with an embodiment of the present invention.

Referring to FIG. 1, an embodiment of the present invention is illustrated. This embodiment is arranged to provide a system for analyzing compressed video, comprising: a recompression detection engine arranged to analyze a compressed video sequence associated with a raw video sequence and to determine whether the compressed video has been processed by a predetermined video compression codec for multiple times using a same set of coding parameters.

In this example embodiment, the interface and processor are implemented by a computer having an appropriate user interface. The computer may be implemented by any computing architecture, including portable computers, tablet computers, stand-alone Personal Computers (PCs), smart devices, Internet of Things (IOT) devices, edge computing devices, client/server architecture, "dumb" terminal/mainframe architecture, cloud-computing based architecture, or any other appropriate architecture. The computing device may be appropriately programmed to implement the invention.

The system may be used to receive a raw, i.e. without compressed or encoded using predetermined video compression codec, video clip or sequence and a compressed video sequence, and determine if the compressed video has been recompressed multiple times, even though the compressed video has been recompressed using the same codec, e.g. H.266/VVC, with the same encoding parameters, such as but not limited to bitrate and video size. With such a system for analyzing compressed video, recompressed video may be detected, which may be useful for identifying manipulated or edited video.

As shown in FIG. 1 there is a shown a schematic diagram of a computer system or computer server 100 which is arranged to be implemented as an example embodiment of a system for analyzing compressed video. In this embodiment the system comprises a server 100 which includes suitable components necessary to receive, store and execute appropriate computer instructions. The components may include a processing unit 102, including Central Processing United (CPUs), Math Co-Processing Unit (Math Processor), Graphic Processing United (GPUs) or Tensor processing united (TPUs) for tensor or multi-dimensional array calculations or manipulation operations, read-only memory (ROM) 104, random access memory (RAM) 106, and input/output devices such as disk drives 108, input devices 110 such as an Ethernet port, a USB port, etc. Display 112 such as a liquid crystal display, a light emitting display or any other suitable display and communications links 114. The server 100 may include instructions that may be included in ROM 104, RAM 106 or disk drives 108 and may be executed by the processing unit 102. There may be provided a plurality of communication links 114 which may variously connect to one or more computing devices such as a server, personal computers, terminals, wireless or handheld computing devices, Internet of Things (IOT) devices, smart devices, edge computing devices. At least one of a plurality of communications link may be connected to an external computing network through a telephone line or other type of communications link.

The server 100 may include storage devices such as a disk drive 108 which may encompass solid state drives, hard disk drives, optical drives, magnetic tape drives or remote or cloud-based storage devices. The server 100 may use a single disk drive or multiple disk drives, or a remote storage service 120. The server 100 may also have a suitable operating system 116 which resides on the disk drive or in the ROM of the server 100.

The computer or computing apparatus may also provide the necessary computational capabilities to operate or to interface with a machine learning network, such as neural networks, to provide various functions and outputs. The neural network may be implemented locally, or it may also be accessible or partially accessible via a server or cloud-based service. The machine learning network may also be untrained, partially trained or fully trained, and/or may also be retrained, adapted or updated over time.

Figure 2:
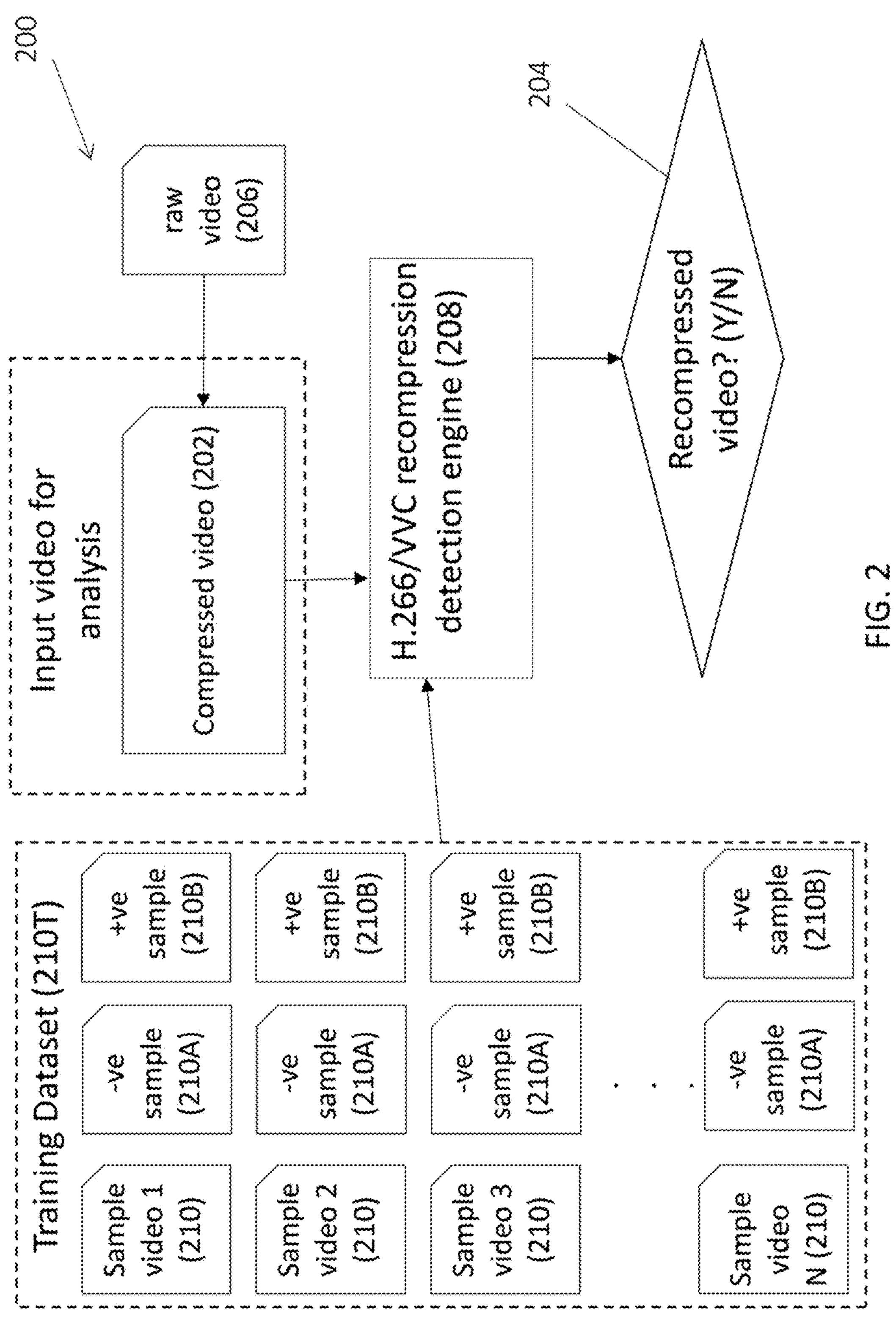
FIG. 2 is a block diagram showing a system for analyzing compressed video in accordance with an embodiment of the present invention.

With reference to FIG. 2, there is shown an embodiment of the system 200 for analyzing compressed video. In this embodiment, the server 100 is used as part of a system 200 as arranged to receive input video sequences, analyze the compressed video sequence 202 such as identifying video compression/recompression degradations or errors introduced in the compressed video sequence 202, and finally provide an output 204 which indicate if the compressed video sequence has been processed by the same video compression codec, such as a Versatile Video Coding (H.266/VVC) compression standard, for multiple times using the same set of coding parameters.

For example, a compressed video sequence 202 which has been recompressed/encoded with the H.266/VVC codec, originating from a raw video sequence 206, may be provided to the system 200 for analyzing compressed video. The system 200 comprises a recompression detection engine 208 which may then look for coding errors which may accumulate when the same video has been recompressed for multiple times by observing features in sequences of image frames in the video.

The inventors devised that double compression errors are inevitable in recompressed videos no matter how coding parameters vary. In the multiple compression process, the coding errors would definitely lead to changes in pixel value, and according these errors may be identified detection feature can effectively characterize this type of changes. Details of the feature extraction process are further explained later in this disclosure.

In an alternative example, if a compressed video sequence 202 which has been compressed/encoded once, i.e. processed by the encoder staring from the raw video sequence 206, coding errors may be less significant and the input video sequence 202 may be identified as not being recompressed, or compressed once only, using the predetermined compression codec.

One possible application of identify an input video sequence encoded using the H.266/VVC codec is that, it may be necessary to prove that a video clip is genuine and has not been manipulated or modified.

Without wishing to be bound by theory, H.266/VVC still adopts block-based hybrid coding strategy like its predecessor H.265/HEVC, and the basic processing unit within a picture in H.266/VVC is the coding tree unit (CTU). For the block partition strategy, a picture can be divided into Coding Tree Units (CTUs), CTUs can be further divided into several coding units (CUs) by quadtree or multi-type tree partitioning with a size range: The Smallest CU (SCU) size of 8×8 to the Largest CU (LCU) size of 128×128. The definition of quadtree partition (QT) in H.266/VVC is similar to that of H.265/HEVC, but H.266/VVC supports larger CU sizes which allowing for a better adaptation to image content for high spatial resolutions.

Figure 3:
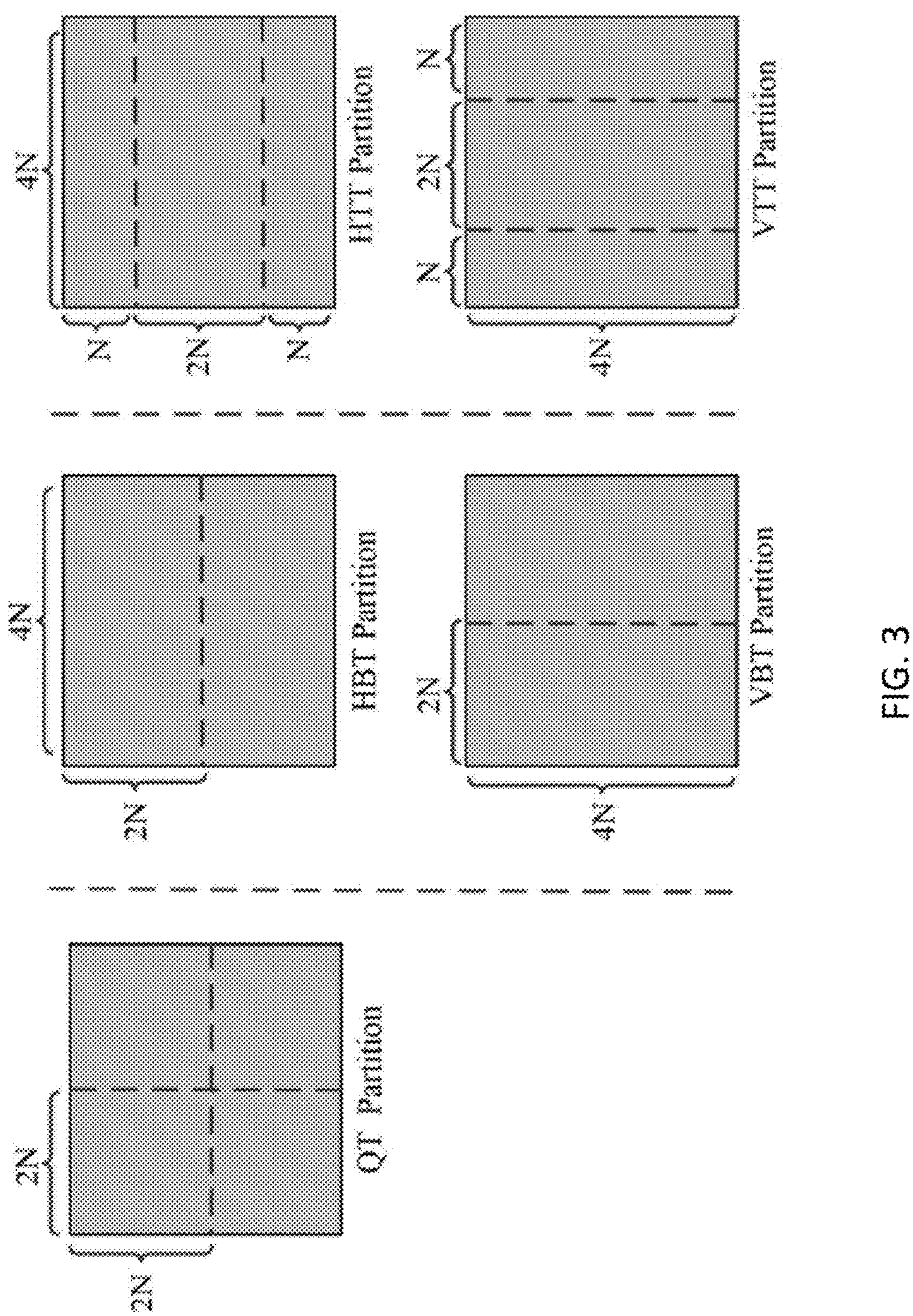
FIG. 3 is an illustration showing tree partition in H.266/VVC.

With reference to FIG. 3, with a view of improving the coding efficiency, a new block partition structure named multi-type tree structure containing Binary Trees (BTs) and Ternary Trees (TTs) is introduced in H.266/VVC. Horizontal Binary Trees and Ternary Trees are defined as HBT and HTT, respectively; and Vertical Binary Trees and Ternary Trees are defined as VBT and VTT, respectively. For example, for a block with a size of 4N×4N, HBT and VBT split the block into two 4N×2N blocks and two 2N×4N blocks in the horizontal and vertical directions, respectively. TT splits the block into three sub-blocks. HTT performs block partitioning in the horizontal direction, and the sizes of the split sub-blocks are 4N×N, 4N×2N, 4N×N. Those of VTT are N×4N, 2N×4N, and N×4N. Due to the multitype tree partition, the PUs in H.265/HEVC, which can take non-square sizes, are abandoned. It is because the CU sizes can be non-square in H.266/VVC. Therefore, in H.266/

VVC, CU is also adopted as the unit for prediction and transformation, unless it is too large for the maximum transform length. Referring to FIG. 3, illustrations from left to right and top to bottom, respectively represent QT partition, HBT partition, HTT partition, VBT partition and VTT partition.

Compared with H.265/HEVC, the number of angular prediction directions in H.266/VVC may be increased from 33 to 65. These angular prediction directions are defined from 45 to −135 degrees in a clockwise direction for a square shape coding unit. For blocks with the width greater than height, the upper reference pixel is more likely to be used than the left reference pixel, while for blocks with the width less than height, the left reference pixel is more likely to be used. Therefore, Wide Angle Intra Prediction (WAIP) may be used in H.266/VVC. If the shape of the coding unit is not square, the wide-angle direction is used instead of the original direction. In these cases, 14 angles using prediction from the shorter side of a block are replaced by more extreme angles using prediction from the longer side, bringing the total number of angles supported in the design to 93 while the number of angular modes that can be signaled for any particular block size remains 65.

Figures 4A, 4B:
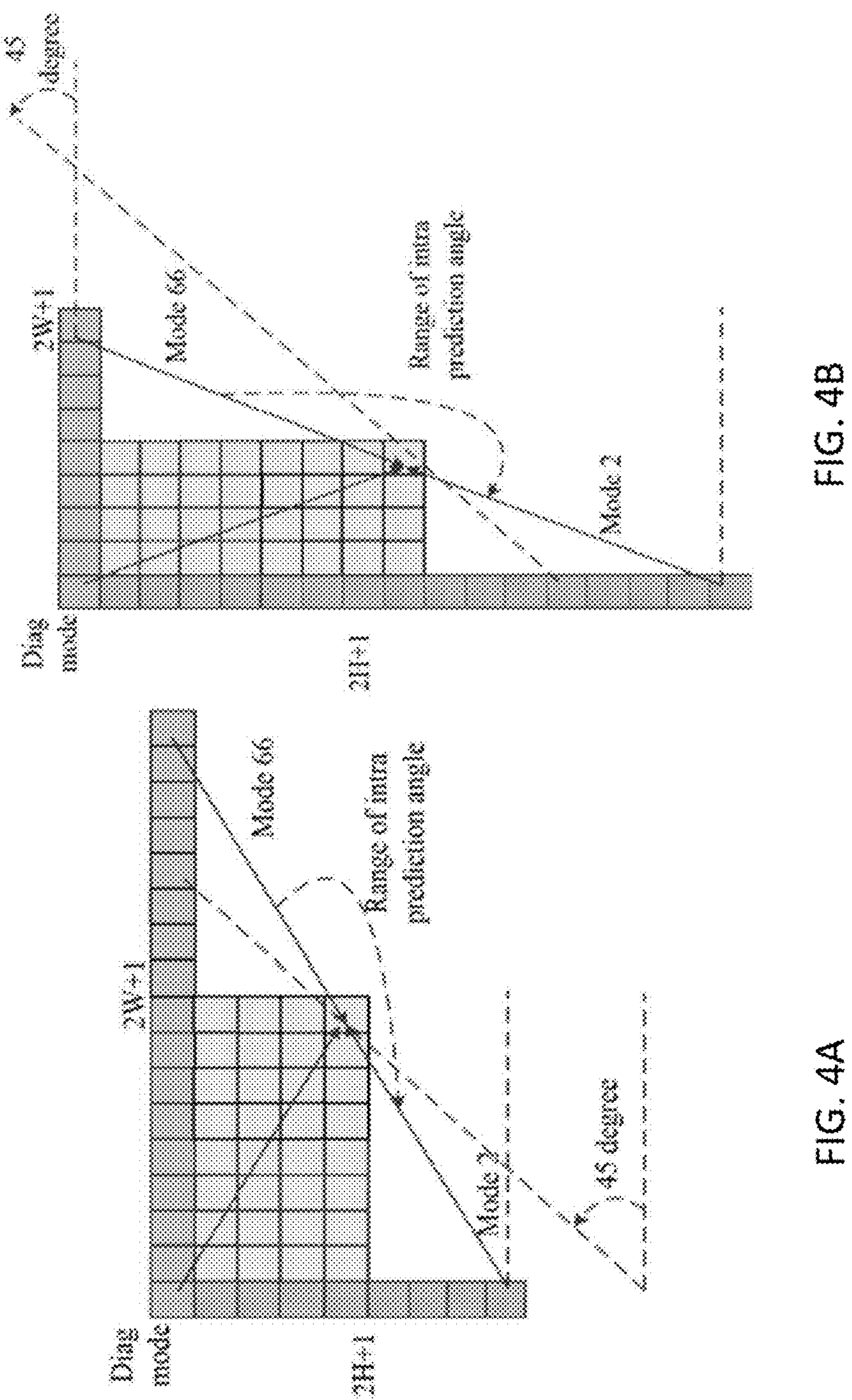
FIG. 4A is an illustration showing examples of reference pixels for non-square block with a size of 8×4.
FIG. 4B is an illustration showing examples of reference pixels for non-square block with a size of 4×8.

Preferably, the usage of WAIP would not lead to any changes in H.266/VVC intra coding, since the modes in the range of 67 to 80 are mapped as its corresponding mode in the range of 2 to 14, and the mapping of these modes in the range of −14 to −1 is also similar. With reference to FIGS. 4A and 4B, examples of reference pixels for non-square blocks, where the block in FIG. 4A is with a size of 8×4, it can be observed that the number of reference pixels in the horizontal direction is 17, and the number in the vertical direction is 9.

Alternatively, different from the 45 to −135 degrees pixel referencing strategy, mode {2, 3, . . . , 7} may be replaced with the value of the corresponding mode plus 65. Similarly, the pixel reference corresponding to the case where the block size is 4×8 in FIG. 4B is also easy to understand. For different ratios of block height and width, the detailed mode replacement strategy is shown in Table 1 below, W/H in the table represents the ratio of block width and height.

TABLE 1

Intra prediction mode replacement in WAIP

| W/H | The replaced mode | Replace with | W/H | The replaced mode | Replace with |
|---|---|---|---|---|---|
| 16 | [2, 3, . . . , 15] | mode +65 | ½ | [61, 62, . . . , 66] | mode −67 |
| 8 | [2, 3, . . . , 13] | mode +65 | ¼ | [57, 58, . . . , 66] | mode −67 |
| 4 | [2, 3, . . . , 11] | mode +65 | ⅛ | [55, 56, . . . , 66] | mode −67 |
| 2 | [2, 3, . . . , 7] | mode +65 | 1/16 | [53, 54, . . . , 66] | mode −67 |

In order to explore the potentially effective features, it may be preferable to analyze the generation of H.266/VVC double compression traces, which may be useful for recompression detection, more preferably processed by a recompression detection engine which includes a machine-learning based processing engine.

Preferably, the recompression detection engine 208 of the system 200 may be trained by: obtaining multiple sets of positive samples of recompressed video sequence each represent the compressed video sequence which has been processed by the predetermined video compression codec for multiple times using the same set of coding parameters; obtaining multiple sets of negative samples of recompressed video sequence each represent the compressed video sequence which has been processed by the predetermined video compression codec once only; and providing the multiple sets of positive samples and negative samples of recompressed video sequence so as to train the recompression detection engine in a machine learning process.

Preferably, the recompressed video sequence is reprocessed by the predetermined video compression codec for at least once using the same set of coding parameters, after processing the raw video sequence with an initial compression and decompression cycle using the predetermined video compression codec and the same set of coding parameters.

For example, with reference to back to FIG. 2, multiple sets of training data, including preferably a pair of positive sample and negative sample, each obtained by encoding a raw sample video sequence 206 using a video encoder, may be provided for training the recompression detection engine 208 in a machine leaning process. In this example, a sample video sequence 210 may be a YUV sequence which may be compressed once to become a negative sample 210A of recompressed video, and the negative sample 210A may be further decompressed and recompressed again to become a positive sample 210B of recompressed video.

Preferably, the recompression detection engine 208 may be trained with a training dataset 210T which comprises multiple sets of sample video sequences 210 and corresponding pairs of positive sample 210B and negative sample 210A to improve the performance of the recompression detection engine 208 or to enhance the results 204 obtained by the recompression detection engine 208 in future operations.

Figures 5, 6:
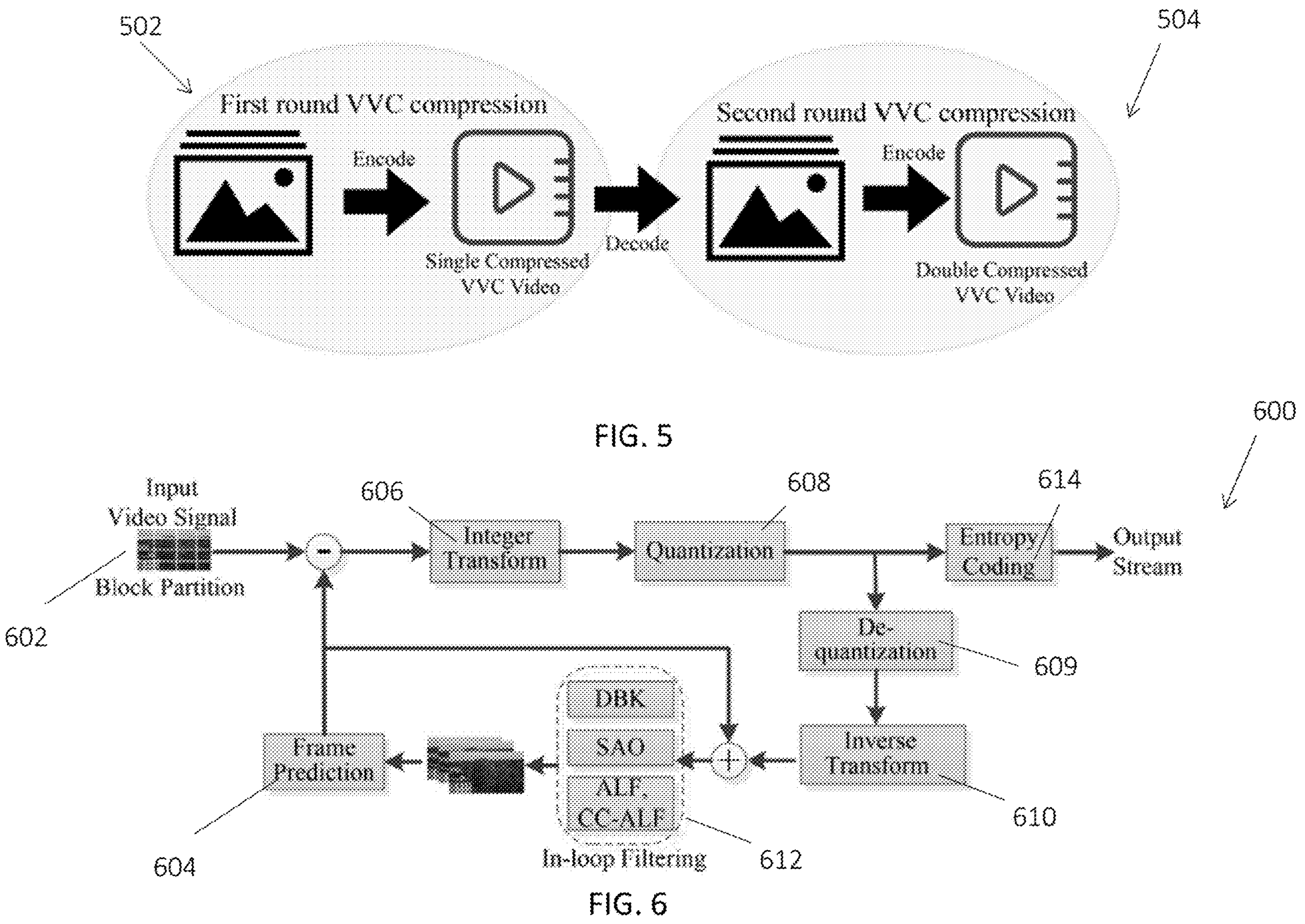
FIG. 5 is a flow diagram showing single and double compression of a video sequence.
FIG. 6 is a flow diagram of a process of H.266/VVC video coding.

With reference to FIG. 5, the original single compressed H.266/VVC video may be generated in the first-round compression procedure 502. After decoding, it undergoes the second round H.266/VVC compression 504 and is encoded into a double compressed video. If the parameters used in these two compressions are consistent, this procedure is defined as double compression with the same parameters.

Following the coding procedure 602 of H.266/VVC in FIG. 6, the whole procedure may be divided into block partition 602, block-based frame prediction 604, transformation 606 and quantization 608 and dequantization 609, inverse transformation 610, in-loop filtering 612 and entropy coding 614. The mathematical symbols of the corresponding operations are summarized in Table 2.

TABLE 2

NOTATION

| | |
|---|---|
| T(·) | Transform |
| (·)/Q | Quantization |
| n | The time of compression |
| $C^{(n)}$ | Quantized DCT/DST coefficient in the $n^{th}$ compression |
| $S^{(n)}$ | Input Value of the source YUV video in the $n^{th}$ compression |
| $PS^{(n)}$ | The Predicted value of $S^{(1)}$ in the $n^{th}$ compression |
| R(·) | Rounding operation |
| $ReC^{(n)}$ | Reconstructed coefficient in the $n^{th}$ compression |
| RT(·) | Rounding and truncating |
| IT(·) | Inverse Transform |
| Ψ(·) | In-loop filter |
| $S_{\Psi}^{(1)}$ | Filtered reconstructed value |

On this basis, the transformation coefficient of single compressed video can be calculated as $C^{(1)}=R(T(S^{(1)}-PS^{(1)})/Q)$. Then, $C^{(1)}$ undergoes the backward decoding procedure to form the reconstructed coefficient, i.e., $ReC^{(1)}=RT(IT(C^{(1)}/(Q)^{-1}))$. After in-loop filtering, the filtered reconstructed value can be denoted by:

$$S_\Psi^{(1)} = \Psi\left(PS^{(1)} + RT\left(IT\left(C^{(1)}/(Q)^{-1}\right)\right)\right),$$

and the reconstructed frame would be sent to the buffer.

If the video undergoes double compression, the output of the first coding would be used as the input of the second coding. Then, $C^{(2)}$ can be calculated as:

$$C^{(2)} = R\left(T\left(S_\Psi^{(1)} - PS^{(2)}\right)/Q\right).$$

Further, the filtered reconstructed value of double compressed video can be represented by:

$$S_\Psi^{(2)} = \Psi\left(PS^{(2)} + RT\left(IT\left(\left[T\left(S_\Psi^{(1)} - PS^{(2)}\right)/Q\right]/Q^{-1}\right)\right)\right).$$

By subtracting $$S_\Psi^{(1)} \text{ and } S_\Psi^{(2)},$$

the double compression traces can be formulated as:

$$\Delta DC = S_\Psi^{(1)} - S_\Psi^{(2)}.$$

Therefore, the effect of in-loop filtering in H.266/VVC on the quality degradation of multiple compressed video has been analyzed. YUV sequence in_to_tree is selected as the test sequence, and Quantization Parameter (QP) is selected from {5, 25, 35, 50} for both single and double compression. 5 consecutive compressions and decompressions were performed on the test sequence by using VTM-14.0 software and the Peak Signal to Noise Ratio (PSNR) between filtered and unfiltered videos is calculated. The usage of filtering is achieved by turning the filtering switch on and off in the cfg file. Finally, the variance and the mean of PSNR difference between filtered and unfiltered videos according to Eq1 and Eq 2, where $\sigma$,M represent the standard deviation and the mean were calculated. T,NI are the compression times and the number of intra coded frames respectively. $IP_{i,n}$ is the difference in PSNR of the $n^{th}$ filtered and unfiltered I-frames in the $i^{th}$ compression. Then results can be obtained as reported in Table 3. The binary codes in the table represent the states of the three filters in the loop, where the first bit represents the state of deblock filter. The second and third bits represent those of SAO filter and adaptive loop filter, respectively.

$$\sigma = \sqrt{\frac{1}{T} \times \frac{1}{NI} \sum_{i=1}^{T} \sum_{n=1}^{NI} (IP_{i,n} - M)^2}$$

$$M = \frac{1}{T} \times \frac{1}{NI} \sum_{i=1}^{T} \sum_{n=1}^{NI} IP_{i,n}$$

TABLE 3

The statistics of the PSNR difference between filtered and unfiltered I-frames.

| | QP = 5 | | | | | | | | QP = 25 | | | | | | |
|---|---|---|---|---|---|---|---|---|---|---|---|---|---|---|---|
| | 000 | 100 | 010 | 110 | 001 | 101 | 011 | | 000 | 100 | 010 | 110 | 001 | 101 | 011 |
| M | 0.522 | 0.478 | 0.483 | 0.417 | 0.440 | 0.402 | 0.414 | M | 0.472 | 0.410 | 0.388 | 0.325 | 0.390 | 0.302 | 0.310 |
| σ | 0.071 | 0.062 | 0.077 | 0.060 | 0.057 | 0.072 | 0.070 | σ | 0.072 | 0.068 | 0.072 | 0.078 | 0.080 | 0.074 | 0.074 |
| Avg | M = 0.451, σ = 0.067 | | | | | | | Avg | M = 0.371, σ = 0.074 | | | | | | |
| | QP = 35 | | | | | | | | QP = 50 | | | | | | |
| | 000 | 100 | 010 | 110 | 001 | 101 | 011 | | 000 | 100 | 010 | 110 | 001 | 101 | 011 |
| M | 0.454 | 0.407 | 0.380 | 0.315 | 0.400 | 0.306 | 0.325 | M | 0.430 | 0.311 | 0.325 | 0.300 | 0.324 | 0.287 | 0.305 |
| σ | 0.069 | 0.058 | 0.065 | 0.073 | 0.055 | 0.072 | 0.066 | σ | 0.055 | 0.062 | 0.071 | 0.076 | 0.059 | 0.063 | 0.066 |
| Avg | M = 0.370, σ = 0.065 | | | | | | | Avg | M = 0.326, σ = 0 .065 | | | | | | |

It can be observed from the derivation that ΔDC is mainly caused by rounding, truncation, and filtering. On the topic of video distortion analysis, how rounding, truncation, and filtering affect the video quality degradation after multiple compression may also be relevant. Using statistical analysis, it is observed that the quality degradation of intra-frame HEVC coding mainly comes from the integer error and truncation error in the quantization and reverse quantization procedures, and the error caused by in-loop filtering tends to be zero matrix. By exploring further, it is easy to understand that the truncation and rounding rules in H.266/VVC are almost the same as H.265/HEVC.

As can be observed from Table 3, the PSNR difference between filtered and unfiltered I-frames is maintained at around 0.326~0.451. When all three filters are turned off, the difference achieves the largest value. Anyway, no matter how the filters are set, the standard deviations remain at small values which means the quality degradation characteristic still exists in H.266/VVC double compression. Therefore, for the detection of H.266/VVC double compression with the same coding parameters, a detection method based on the analysis of CU partition and prediction modes is provided.

As described earlier, video multiple compression, including H.266/VVC double compression, would inevitably introduce additional traces. These traces would definitely affect the rate-distortion optimization results and have an impact on the encoded output to some extent. Preferably, the variation of CU partition after H.266/VVC multiple compression is analyzed to verify this point of view and to promote the exploration of reasonable feature characterization, so as to design effective detection features and provide solutions for H.266/VVC double compression detection.

In an experiment carried out by the inventors, hall_cif.yuv and akiyo.yuv were selected as the test sequences. Then single H.266/VVC compression is performed on these sequences by using VTM-14.0 coding tool. The compiled DecoderApp.exe file is used for decoding, and its output is further encoded into 0.266 files. The value of QP is set to 32 when compressing hall_cif.yuv, and double compression is performed on akiyo.yuv with QP fixed at 20. It is worth noting that the same parameters are used in the above compressions. The parameters ENABLE_TRACING and KO149_BLOCK_STATISTICS were set in TypeDef.h of VTM-14.0 to 1, thus enabling block statistics, which can be analysed with YUView. The file name of the produced trace file and trace rule is also defined on the decoding side.

Figure 7:
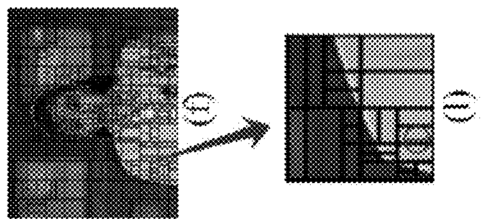
FIG. 7 are images of CU partition of the first I-frame of video clips hall cif and akiyo, in which (a-f) are partition modes of single, double, triple compressed videos; (g-l) are zoomed version of the partition modes of the 64×64 blocks marked with red boxes.
Figure 7:
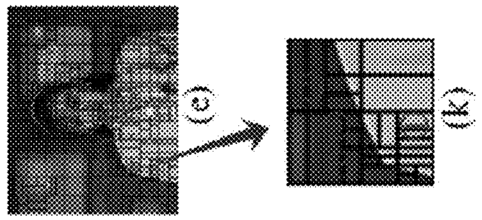
Figure 7:
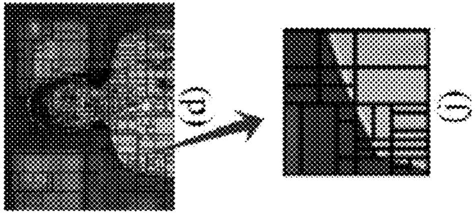
Figure 7:
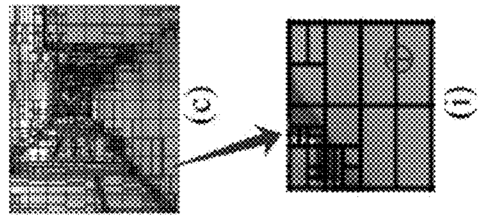
Figure 7:
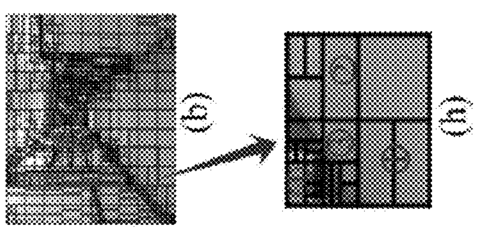
Figure 7:
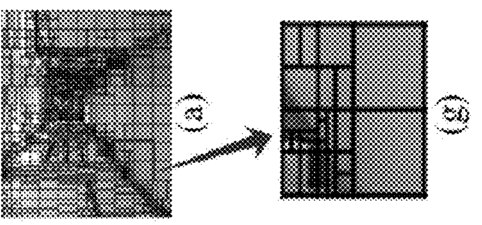

By performing three consecutive compressions and decompressions, CU partition in the luma component of the first I-frame is analyzed as shown in FIG. 7. Subfigures (a-c) and (d-f) are the results after single, double and triple H.266/VVC compression of the two sequences, while (g-i) and (j-l) are their respective zoomed version. The differences of block partition between the current block and their previous encodings are marked with red numbers. As can be seen, after H.266/VVC encoding, CUs can be squares with size N×N, where N∈{4, 8, 16, 32, 64}, or a series of non-square sizes, e.g., 4×8, 8×16, 16×32. CUs with smaller sizes are more inclined to be utilized in the edge or complexity part of the picture, while those with larger sizes usually appear in smooth areas.

In this example, after multiple compressions, the CU partition at the same position of these frames is not fixed. As shown in subfigures (g-i), compared with subfigure (g), the partition of areas marked with red numbers in (h-i) is significantly different. This phenomenon can also be observed in subfigures (j-l). The result can be attributed to the introduction of double and triple compression traces. Besides, due to the quality degradation mechanism, the changes caused by triple compression seem to be less than those of double compression. Therefore, this characteristic may be used to design detection features for double compression detection. Since pixel perturbation caused by these traces would introduce instabilities in CU partition and intra prediction, therefore the inventors further evaluated the variation of CU partition and consistency of prediction modes for the detection of H.266/VVC double compression.

Since double compression would cause variation in CU partition, the variation of partition modes of coding units feature is constructed for the characterization of H.266/VVC double compression traces. Minimum Unit Mapping (MUM) may be first performed to reduce the interference of quadtree or multi-type tree partition to mode analysis, also to facilitate the calculation of block number. MUM is a mapping from the source CU to the minimum unit. In this work, the source CU is defined as S ouCU=(Md, Lb, IaP), where Md represents the partition modes of source CU, and each mode is tagged with its label (Lb), IaP is the intra prediction mode.

Preferably, during each decoding procedure in the compression and decompression cycle, statistics of coding unit (CU) partition and prediction modes from I-frames of the video is extracted, and wherein different CU partition modes and prediction mode statics for all coding units are labeled with a corresponding mode number, wherein different CU partition modes consists of different number of 4×4 minimum units.

Then, the MUM strategy can be given as: MUM:(Md)→(4×4, Lb). The goal is to divided the source CUs evenly into 4×4 minimum units, and those smallest units in the same CU are labeled with the same type code. As shown in Table 4, 32×32, 16×16, 8×8, 4×4, 4×8, 8×4, 8×16, 16×8, 16×32, 32×16, 4×16, 16×4, 8×32, 32×8, 4×32, 32×4 CUs in the luma component are chosen for the calculation because of their quantities, and these CUs may be labelled from 1 to 16 without repetition, e.g. it is easy to understand that a 16×16 unit can be divided into 16 minimum units.

Figure 8A:
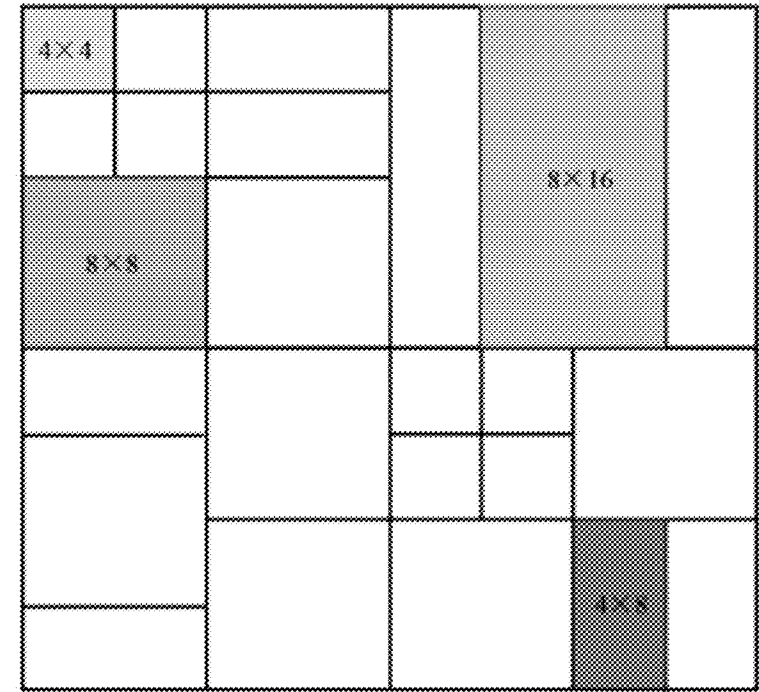
FIG. 8A is an illustration showing an example of CU partition modes in H.266/VVC.
Figure 8B:
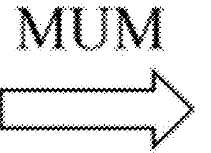
FIG. 8B is an illustration showing an example of Minimum unit mapping with labels in units of 4×4.

According to the look-up table, the label of 16×16 partition mode is 3. Therefore, these 16 minimum units are also marked with 3. By traversing all the units, the division and mapping can be realized. With reference to FIGS. 8A and 8B, the MUM mapping result of a 32×32 block is shown, in which the original 4×4 unit in FIG. 8A is labeled with 1, and the unit with a size of 8×16 is divided into 8 4×4 subunits shown in FIG. 8B, which are labeled with 7. In this way, the variation of CU partition modes after mapping may be effectively measured, thereby reducing the interference caused by the complex CU partition modes in H.266/VVC standard.

TABLE 4

Indexes of CU partition modes in intra frame prediction.

| Mode | Label |
|---|---|
| 4 × 4 | 1 |
| 8 × 8 | 2 |
| 16 × 16 | 3 |
| 32 × 32 | 4 |
| 4 × 8 | 5 |
| 8 × 4 | 6 |
| 8 × 16 | 7 |
| 16 × 8 | 8 |
| 16 × 32 | 9 |
| 32 × 16 | 10 |
| 4 × 16 | 11 |
| 16 × 4 | 12 |
| 8 × 32 | 13 |
| 32 × 8 | 14 |
| 4 × 32 | 15 |
| 32 × 4 | 16 |

The measurement of the strength of the variation in the number of CUs is performed on the mapped units of the input video. Firstly, the CU partition modes in intra coded frames are extracted during decoding procedure. Then, MUM is performed and the number of 4×4 minimum units mapped from the block of label Lb in the $i^{th}$ compression can be calculated as:

$$NCU_{Lb}^{n,i} = \sum_{r=1}^{R}\sum_{c=1}^{C}\rho_{c,r}$$

where n represents the $n^{th}$ I-frame, $\rho_{c,r}$ in the equation is defined as:

$$\rho_{c,r} = \begin{cases} 1, & \text{If the label at coordinate } (c, r) \text{ } is \text{ } Lb \\ 0, & \text{others} \end{cases}$$

Then, the strength of the variation in the number of CUs in the $i^{th}$ compression can be calculated as:

$$VCU_{Lb}^{i} = \frac{1}{NI}\sum_{n=1}^{NI}\frac{\left|NCU_{Lb}^{n,i+1} - NCU_{Lb}^{n,i}\right|}{SMU_{Lb}^{n,i+1}},\ Lb \in \{1, 2, \ldots, 16\}$$

where NI is the total number of I-frames in the video and $$SMU_{Lb}^{n,i}$$

is the Sum of the number of Minimum Units mapped from the block of label Lb in the $n^{th}$ I-frame of the $i^{th}$ compression.

$$\left(NCU_{Lb}^{n,i+1} - NCU_{Lb}^{n,i}\right)$$

in the formula represents the difference of the number of 4×4 minimum units mapped from the block of label Lb after two consecutive compressions.

Therefore, to construct the variation of partition modes of coding units feature, cycles of consecutive compressions and decompressions three times were performed, and a 48-D feature set can be obtained:

$$F_{vpar} = \left\{VCU_{Lb}^{1}, VCU_{Lb}^{2}, VCU_{Lb}^{3}\right\},\ Lb \in \{1, 2, \ldots, 16\}$$

To fully explore double compression traces in coding domain, the consistency of prediction modes of coding units feature for double compression detection is constructed. Preferably, during each decoding procedure after $i^{th}$ compression, prediction mode based feature set are further concatenated into a fusion feature for detection in the training process, wherein the prediction modes based feature set is obtained based on consistency ratios of adjacent prediction mode pairs in horizontal, vertical, major diagonal and minor diagonal directions after multiple compressions.

Figures 9A, 9B:
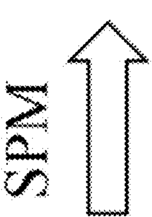
FIG. 9A is an illustration showing an example of intra prediction modes for blocks of CUs in a 32×32 block.
FIG. 9B is an illustration showing an example of subunit prediction mapping with labels in units of 4×4.

Subunit Prediction Mapping (SPM) may be first defined to facilitate the evaluation of modes consistency. In one example embodiment, the source CU is defined as S ouCU=(Md, Lb, IaP), IaP represents the intra prediction mode, which can be selected from {0, 1, . . . , 66}. Then, SPM can be denoted as: SPM:(Md,IaP)→(4×4,IaP). The source CU may be mapped into a series of 4×4 subunits, and each subunit is labeled according to the intra prediction mode of the parent unit. The intra prediction mode and partition mode of each block during the decoding procedure may then be extracted. Blocks with different sizes are divided evenly in units of 4×4, and subunits belonging to the same CU share the same prediction mode. Since H.266/VVC supports 67 intra prediction modes, the mode values and labels of these subunits are assigned the prediction modes of their parent units. FIG. 9A illustrates an example of intra prediction modes of CUs in a 32×32 block. SPM may be performed on it and the mapping result is given in FIG. 9B. As can be seen, an 8×8 block can be divided into 4 4×4 subunits, and their prediction modes after division are consistent with that of the parent unit in FIG. 9A. By adopting this mapping method, the number of adjacent prediction mode pairs in different directions can be calculated more accurately.

After SPM procedure, the consistency ratios of adjacent prediction mode pairs in the horizontal, vertical, major diagonal, and minor diagonal directions after multiple compressions for feature construction may be calculated. Defining Prediction Mapping Matrix in the $n^{th}$ I-frame of the $i^{th}$ compression as $$PMM^{n,i} = \left(m_{r,c}^{n,i}\right)_{R\times C},$$

where $$m_{r,c}^{n,i}$$

is the intra prediction mode of 4×4 subunit located at (r,c). R and C indicate the number of rows and columns after mapping respectively, then the number of mode pairs of two adjacent blocks with a step of 1 may be calculated. For the calculation in the horizontal direction, the number of adjacent prediction mode pairs combined as ($mode_1$,$mode_2$) is calculated as:

$$MP(\text{mode}_1, \text{mode}_2) = \sum_{r=1}^{R}\sum_{c=1}^{C}\partial_{c,r}$$

$\partial_{c,r}$ in the equation is defined as:

$$\partial_{c,r} = \begin{cases} 1, & \left(m_{r,c}^{n,i} = \text{mode}_1\right) \wedge \left(m_{r,c+1}^{n,i} = \text{mode}_2\right) \\ 0, & \text{others} \end{cases}$$

only if the mode pairs is combined as ($mode_1$,$mode_2$), the decision factor $\partial_{c,r}$ would be set to 1, Since H.266/VVC supports 67 intra prediction modes, Prediction Co-occurrence Matrix (PCM) of size 67×67 to measure the co-occurrence of these modes may be constructed. The prediction co-occurrence matrix in the horizontal direction of the $n^{th}$ I-frame of the $t^{th}$ compression is defined as:

$$PCM_{hod}^{n,i} = \left(\lambda_{m_1,m_2}^{n,i}\right)_{67\times 67}$$

where $m_1$, $m_2$ ∈ , $\lambda_{m_1,m_2}$=MP($m_1$−1,$m_2$−1).

After PCM construction, the consistency ratio is presented as:

$$CR_{hod}^{n,i} = \frac{\sum_{m_1=1}^{67}\sum_{m_2=1}^{67} m_1 \times m_2 \times \lambda_{m_1,m_2}^{ni} - \xi_{m_1} \times \xi_{m_2}}{\omega_{m_1} \times \omega_{m_2}}$$

where:

$$\xi_{\tau} = \sum_{m_1=1}^{67}\sum_{m_2=1}^{67} \tau \times \lambda_{m_1,m_2}^{n,i},\ \tau \in \{m_1, m_2\}$$

-continued $$\omega_\tau^2 = \sum_{m_1=1}^{67}\sum_{m_2=1}^{67}(\tau-\xi_\tau)^2\times\lambda_{m_1,m_2}^{n,i},\ \tau\in\{m_1, m_2\}$$

Therefore, the Average Consistency Ratio of the $i^{th}$ compressed input video in the horizontal direction can be calculated as follows:

$$ACR_{hod}^i = \frac{1}{NI}\sum_{n=1}^{NI} CR_{hod}^{n,i}$$

where NI is the total number of I-frames.

By combining the ratios in four directions, the average consistency ratios of coding units of the $i^{th}$ compressed input video can be formulated as:

$$VACR^i = \{ACR_{hod}^i, ACR_{ved}^i, ACR_{mad}^i, ACR_{mid}^i\}$$

where $$ACR_{ved}^i, ACR_{mad}^i, ACR_{mid}^i$$

are the average consistency ratios in the vertical, major diagonal, and minor diagonal directions respectively. By performing consecutive decoding and recompression on the input video and following the same step to calculate the consistency ratios, the related detection features denoted by $VACR^{i+1}VACR^{i+2}$ can be obtained.

Combining the above terms, for the detection of H.266/VVC double compression, the consistency of prediction modes of coding units feature set can be denoted by:

$$F_{cpre} = \{VACR^1, VACR^2, VACR^3\}$$

Further, the 60-D fusion feature vector can be described as follows:

$$F_{fusion} = \{F_{vpar}, F_{cpre}\}$$

By evaluating the variation of partition modes and consistency of prediction modes of coding units between single and double compressed videos after recompressing with the same parameters, the feature can well represent double compression traces.

To observe the statistical properties of the detection feature, the feature vectors of single and double compressed H.266/VVC videos further extracted and calculated. With reference to FIGS. 10A to 10D, the property curves and 3-dimensional distributions are shown.

Figures 10A, 10B, 10C, 10D:
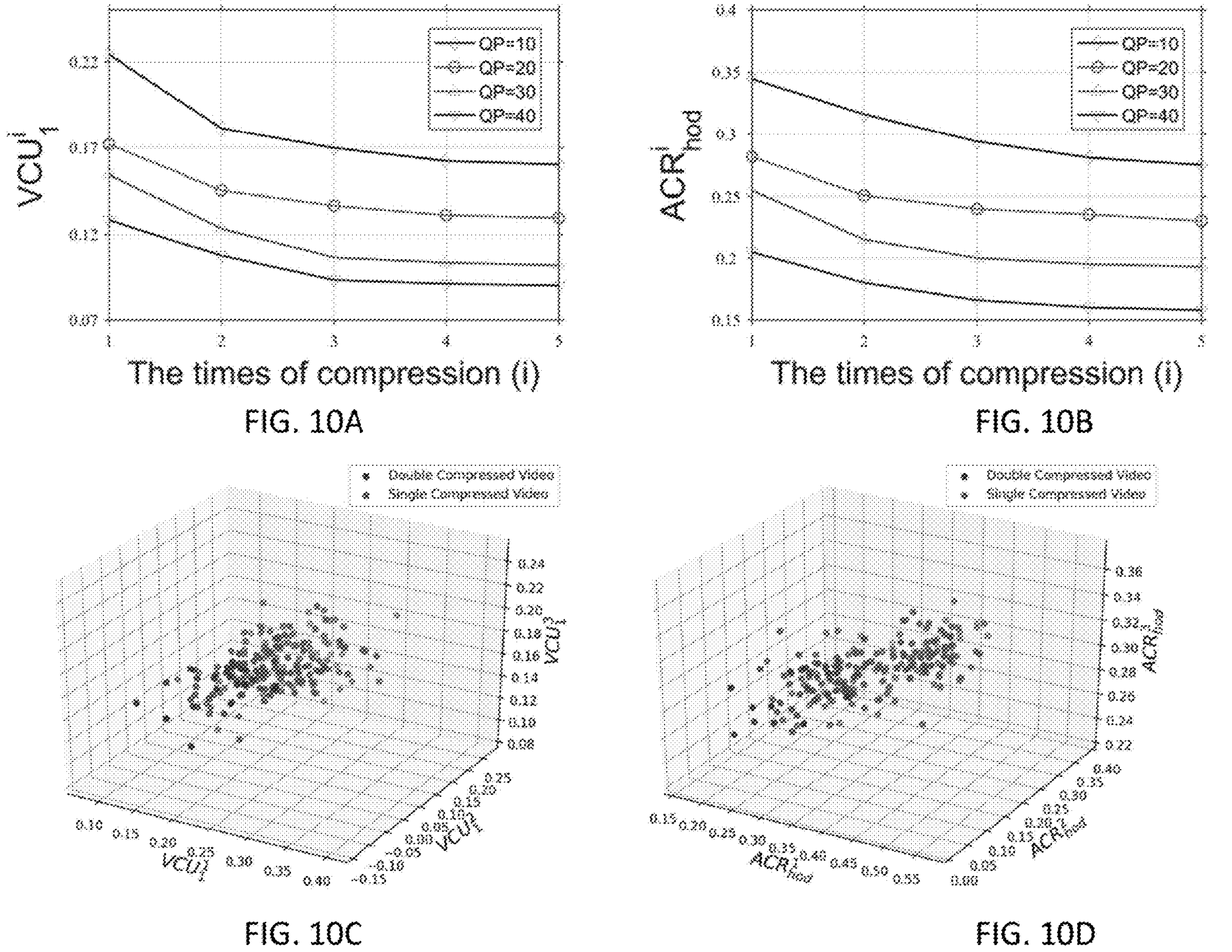
FIG. 10A is a plot showing the variation of $VCU^i_1$ with the compression time.
FIG. 10B is a plot showing the variation of $ACR^i_{hod}$ with the compression time.
FIG. 10C is a graph showing 3-dimensional distributions of $VCU^i_1$ when QP is fixed at 10.
FIG. 10D is a graph showing 3-dimensional distributions of $ACR^i_{hod}$ when QP is fixed at 10.
Figure 11A:
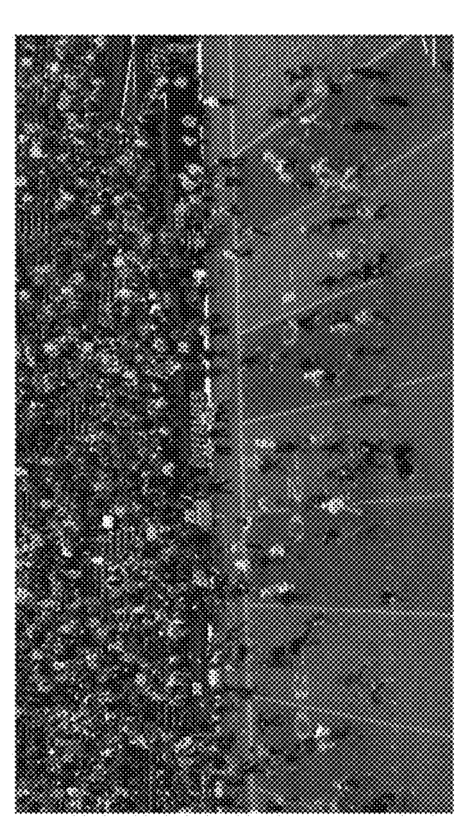
FIG. 11A is an image of a first example of YUV sequences.
Figure 11B:
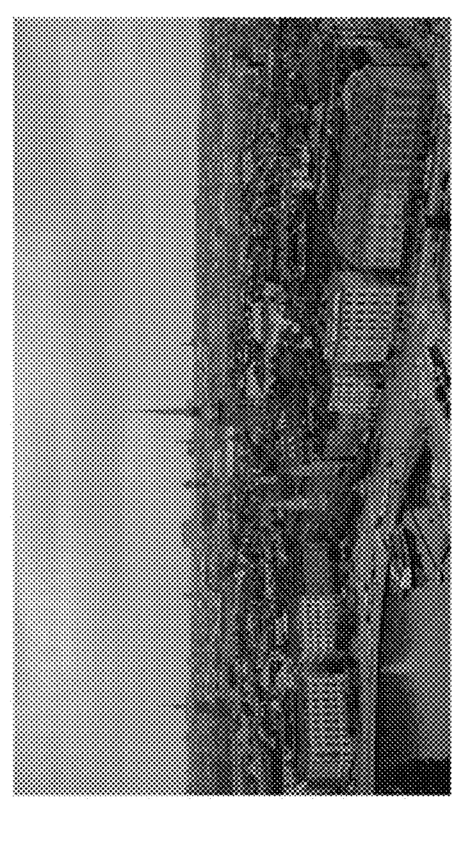
FIG. 11B is an image of a second example of YUV sequences.
Figure 11C:
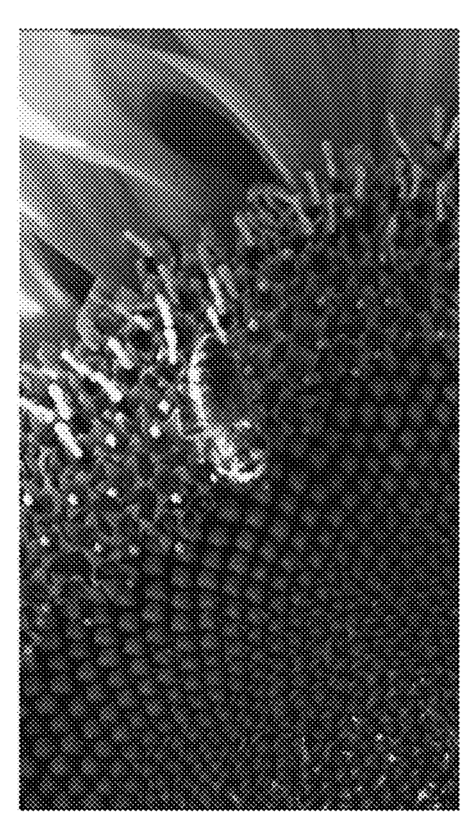
FIG. 11C is an image of a third example of YUV sequences.
Figure 11D:
FIG. 11D is an image of a fourth example of YUV sequences.

FIGS. 10A and 10B respectively show the variation of $$VCU_1^i \text{ and } ACR_{hod}^i$$

with the compression time. These data are calculated and averaged over 112 video clips which are comprehensively described later when QP is selected from {10, 20, 30, 40}. As can be seen, with the increase of the compression time i, both $$VCU_1^i \text{ and } ACR_{hod}^i$$

would gradually decrease to different degrees, and the slope of each line gets smaller as i increases. This phenomenon is mainly because the trend of quality degradation would get smaller and smaller with the increase of compression times. Then the variation of pixels and the selection of coding mode tend to be stable. Since a higher QP would cause more information loss, this phenomenon is more obvious when QP gets smaller. This finding also leads us to believe that the $$VCU_1^i \text{ and } ACR_{hod}^i$$

of other types of CU would also follow similar rules. FIGS. 10C and 10D respectively show the 3-dimensional distributions of $$VCU_1^i \text{ and } ACR_{hod}^i$$

of double and single compressed video clips in our dataset when QP is fixed at 10. It can be observed that these two types of feature statistics show a certain difference in distribution. So, by using the fused feature, double and single compressed H.266/VVC videos can be distinguished.

As earlier described in this disclosure, the recompression detection engine for recompression detection may be trained by obtaining multiple sets of positive samples of recompressed video sequence each represent the compressed video sequence which has been processed by the predetermined video compression codec for multiple times using the same set of coding parameters; obtaining multiple sets of negative samples of recompressed video sequence each represent the compressed video sequence which has been processed by the predetermined video compression codec once only; and providing the multiple sets of positive samples and negative samples of recompressed video sequence so as to train the recompression detection engine in a machine learning process. Example training process is further described in details as follows:

(1) Video multiple compression and decompression. The input YUV sequence $Y_0$ is first encoded into H.266/VVC video $V_1$ with parameters P, then $V_1$ is decoded into YUV sequence $Y_1$, and further recompressed into H.266/VVC video $V_2$. The recompression parameters are consistent with P. Repeat this continuous encoding and decoding procedures 3 times.

(2) CU partition and prediction modes extraction. During each decoding procedure, extract the statistics of CU partition and prediction modes from I-frames of the videos. For partition modes of 32×32, 16×16, 8×8, 4×4, 4×8, 8×4, 8×16, 16×8, 16×32, 32×16, 4×16, 16×4, 8×32, 32×8, 4×32, 32×4, these modes may be labelled with numbers from 1 to 16. Prediction mode statistics for all units in I-frames are also labeled with their mode numbers.

(3) Feature construction. Perform MUM and SPM on the decoded data and calculate the number of 4×4 minimum units mapped from the block of label Lb in the $i^{th}$ compression. After that, the difference of the number of 4×4 minimum units with the same label after two consecutive compressions can be measured.

$$VCU_{Lb}^1, VCU_{Lb}^2, VCU_{LB}^3$$

of the mapped CUs may be obtained according to Eq. 5. Besides, the number of adjacent prediction mode pairs are also calculated, prediction co-occurrence matrixes may be obtained and the average consistency ratios in four directions so as to obtain $VACR^1$, $VACR^2$, $VACR^3$ may be further calculated. After obtaining the above subfeatures, they are fused into the final feature vector $F_{fusion}$ according to Eq. 16.

(4) Classification. libsvm with Radial Basis Function (RBF) kernel is adopted as the classifier. For the training procedure, $F_{fusion}$ extracted from double compressed H.266/VVC video clips are tagged as 1, and those from single compressed samples are labeled as 0. Then, 5-fold cross validation is utilized for training. The dataset is shuffled randomly, and split the dataset into 5 subsets. For each unique subset, taking the subset as a hold out or test data set, taking the remaining groups as a training data set, gamma, C, cache_size being set to 0.5, 1 and 100 respectively, then, a model is fitted on the training set and it may be evaluated on the test set. By repeating each testing procedure 20 times, the average detection accuracy rate is calculated. After successively iteration, a trained SVM model can be obtained, which can be further used for H.266/VVC double compression detection.

After introducing the main steps of the present method, extensive experiments are conducted for fair comparison to other work on H.266/VVC double compression detection. Regarding the robustness against more realistic scenarios, such as Constant Quantization Parameter (CQP), Average Bit Rate (ABR) rate control modes, different GOP sizes and spatial resolutions are verified.

1 Dataset: 20 1080p(1920×1080) raw YUV sequences with diverse contents are used for datasets construction, some examples (e.g. rush_field_cuts; old_town_cross; sunflower; and snow_mnt) are provided in FIGS. 11A to 11D. Since the lengths of these videos are not fixed, each sequence is split into non-overlapping YUV clips in units of 100 frames, then 112 clips can be obtained. Preferably, single compressed H.266/VVC video clips are defined as negative samples. The positive samples are obtained by decoding and recompressing those singly compressed video clips with the same coding parameters. Note that, samples segmented from the same YUV clip never existed in both the training set and test set simultaneously. The names of the YUV sequences: aspen, blue_sky, controlled_burn, crowd_run, sunflower, park_joy, ducks_take_off, in_to_tree, old_town_cross, pedstrain_area, red_kayak, riverbed, rush_field_cuts, rush_hour, tractor, snow_mnt, speed_bag, touchdown_pass, west_wind_easy, station 2.

2 Detailed Parameters: Versatile Video Encoder (VVenC) was selected as the encoder, since it is a fast and efficient "realworld" H.266/VVC encoder implementation with a series of excellent properties. DecoderApp.exe file compiled from VTM14.0 software using microsoft visual studio 2015 is adopted for video decoding. GOP size is set to 10 in all experiments except for the different GOP sizes case in the later described example which is selected from {10, 20, 30, 40}. For the experiment in CQP mode, QP is traversed from 1 to 51. In terms of ABR mode, the value of bitrate is selected from {2, 3, 4, 5, 6} Mbps. The option –Preset is respectively set to faster, fast, medium, slow, slower, while the default value is used in other experiments. For all parameter combinations, a total of 4480 single compressed and 4480 double compressed video clips are generated. Note that clips segmented from the same YUV sequence never existed in both the training set and test set simultaneously.

3 Evaluation Criterion: SVM classifier is adopted for video classification and Accuracy (ACC) is used as the evaluation criterion, which can be expressed as $$ACC = \frac{TPS + TNS}{PS + NS} \times 100\%$$

where TPS (TNS) is the number of true positive (negative) sample. PS (NS) represents the number of positive (negative) samples.

In the experiment, the performance of each sub-feature in CQP mode is evaluated. VVenC and VTM-14.0 software are used for coding and decoding respectively. By setting the option –q in VVenC, the value of QP can vary from 1 to 51. Then raw YUV sequences are compressed into H.266/VVC single compressed videos and these videos undergo decoding and further encoding to generate re-compressed videos. Note that, the quantization parameters used in both encodings are consistent, and during the decoding procedure, VTM-14.0 software is used for feature extraction. The performance on the dataset is described here, after feature extraction and classification, $F_{vpar}$, $F_{cpre}$ and $F_{fusion}$ are fed to the classifier. Therefore, results in Table 5 can be obtained.

TABLE 5

The detection accuracies (%) of each sub-feature in CQP mode

| QP | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| $F_{fusion}$ | **95.53** | **96.43** | **97.64** | **98.21** | **97.32** | **97.32** | **95.74** | **94.83** | **96.43** | **100** | **98.21** | **98.85** | **95.53** | **98.21** | **100** | **100** | **96.43** |
| $F_{vpar}$ | 85.72 | 93.04 | 90.18 | 90.36 | 85.71 | 92.40 | 84.33 | 87.05 | 90.18 | 91.71 | 93.04 | 84.82 | 86.60 | 90.82 | 90.57 | 91.22 | 95.71 |
| $F_{cpre}$ | 91.25 | 86.61 | 87.50 | 88.39 | 90.68 | 93.04 | 88.57 | 89.46 | 95.71 | 88.39 | 86.61 | 87.50 | 90.46 | 91.29 | 89.29 | 90.18 | 93.04 |
| **QP** | **18** | **19** | **20** | **21** | **22** | **23** | **24** | **25** | **26** | **27** | **28** | **29** | **30** | **31** | **32** | **33** | **34** |
| $F_{fusion}$ | **97.32** | **98.21** | **100** | **97.32** | **95.53** | **98.21** | **96.95** | **96.42** | **97.06** | **97.89** | **95.43** | **98.02** | **99.11** | **96.13** | **98.21** | **95.85** | **95.64** |
| $F_{vpar}$ | 85.71 | 88.39 | 95.39 | 88.39 | 90.18 | 91.25 | 91.82 | 86.79 | 92.04 | 90.61 | 85.71 | 90.68 | 88.39 | 91.25 | 85.71 | 86.61 | 93.93 |
| $F_{cpre}$ | 90.36 | 84.82 | 85.71 | 92.14 | 88.57 | 94.82 | 87.93 | 85.71 | 87.50 | 93.04 | 85.00 | 86.61 | 87.50 | 84.82 | 91.25 | 90.57 | 91.68 |

TABLE 5-continued

| QP | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|
| $F_{fusion}$ | **96.43** | **97.33** | **95.53** | **97.06** | **96.52** | **96.43** | **98.21** | **98.21** | **98.04** | **100** | **97.44** | **94.15** | **95.88** | **97.32** | **100** | **98.21** | **97.32** |
| $F_{vpar}$ | 90.18 | 90.18 | 87.50 | 86.61 | 91.07 | 89.66 | 88.39 | 90.18 | 90.01 | 93.75 | 90.80 | 83.04 | 83.93 | 90.18 | 93.44 | 89.29 | 88.39 |
| $F_{cpre}$ | 86.61 | 90.18 | 91.07 | 91.96 | 89.06 | 90.18 | 93.75 | 93.75 | 92.86 | 92.86 | 91.07 | 86.61 | 88.39 | 91.80 | 91.96 | 91.96 | 92.86 |

Results in Table 5 show that, no matter how QP varies, $F_{fusion}$ always outperforms $F_{vpar}$ and $F_{cpre}$. When QP is selected from {10, 15, 16, 20, 44, 49}, the detection accuracies of $F_{fusion}$ reach 100%, while the highest value of the subfeatures only reach 95.71%, which indicates $F_{fusion}$ is more efficient than $F_{cpre}$ and $F_{vpar}$. In terms of average accuracy, the present method achieves 97.33%, while $F_{vpar}$ and $F_{cpre}$ reach 89.47% and 88.29%, respectively. The result confirms that the detection accuracy can be effectively improved through feature fusion. The better performance of the fused feature can be attributed to the combination of the two subfeatures. By leveraging traces in CU partition and prediction modes, the performance of H.266/VVC double compression detection could be significantly improved.

The performance of the method is also compared with other example methods in constant quantization parameter rate control scenario. For the implementation, PU type and intra luma prediction mode (0-34) are extracted during the decoding process, and Intra Prediction Unit Prediction Mode (IPUPM) feature is constructed for classification. The frequencies of specific intra prediction modes in intra coded frames and inter prediction modes in predicted frames are calculated and further combined into a fusion feature vector for detection. The steganalysis feature extractor, i.e., Subtractive Pixel Adjacency Matrix (SPAM) is adopted to extract the noise residuals from video frames, and Gaussian one-class classifier is employed to achieve the detection task. By performing these methods in CQP mode, detection accuracy rates of these methods can be obtained, as illustrated in Table 6.

TABLE 6

The detection accuracies (%) achieved by the invention, and 3 examples in comparison

| QP | 1 | 2 | 3 | 4 | 5 | 6 | 7 | 8 | 9 | 10 | 11 | 12 | 13 |
|---|---|---|---|---|---|---|---|---|---|---|---|---|---|
| Invention | **95.53** | **96.43** | **97.64** | **98.21** | **97.32** | **97.32** | 95.74 | **94.83** | **96.43** | **100** | **98.21** | **98.85** | 95.53 |
| Example 1 | 93.75 | 95.54 | 92.86 | 96.43 | 93.75 | 92.87 | 95.20 | 90.18 | 92.86 | 94.64 | 94.64 | 93.75 | 90.18 |
| Example 2 | 92.86 | 93.75 | 93.75 | 92.07 | 95.54 | 94.64 | 92.07 | 93.10 | 90.32 | 91.07 | 95.54 | 95.54 | 91.96 |
| Example 3 | 94.64 | 92.86 | 90.18 | 88.62 | 91.07 | 95.36 | **96.43** | 91.32 | 87.50 | 90.72 | 92.86 | 93.75 | 95.53 |
| QP | 14 | 15 | 16 | 17 | 18 | 19 | 20 | 21 | 22 | 23 | 24 | 25 | 26 |
| Invention | **98.21** | **100** | **100** | 96.43 | **97.32** | **98.21** | **100** | **97.32** | 95.54 | **98.21** | **96.95** | **96.42** | **97.06** |
| Example 1 | 93.75 | 92.86 | 95.54 | 96.43 | 93.10 | 96.43 | 98.54 | 94.64 | **96.17** | 93.10 | 90.25 | 92.86 | 91.96 |
| Example 2 | 96.43 | 93.88 | 95.54 | 95.54 | 91.07 | 93.75 | 92.86 | 94.64 | 85.71 | 94.64 | 90.18 | 93.88 | 93.88 |
| Example 3 | 87.14 | 92.86 | 92.86 | 90.18 | 88.39 | 92.86 | 93.75 | 90.27 | 95.54 | 96.43 | 96.05 | 92.32 | 93.88 |
| QP | 27 | 28 | 29 | 30 | 31 | 32 | 33 | 34 | 35 | 36 | 37 | 38 | 39 |
| Invention | 97.89 | **95.43** | **98.02** | **99.11** | **96.13** | **98.21** | 95.85 | **95.64** | **96.43** | **97.33** | **95.53** | **97.06** | **96.52** |
| Example 1 | 97.89 | 94.64 | 90.18 | 93.88 | 90.80 | 92.70 | **98.21** | 92.86 | 90.18 | 92.86 | 90.18 | 95.54 | 90.02 |
| Example 2 | 90.18 | 89.29 | 93.75 | 90.18 | 94.64 | 90.73 | 94.64 | 93.75 | 86.61 | 93.75 | 90.18 | 94.64 | 93.75 |
| Example 3 | 91.50 | 93.75 | 92.86 | 94.64 | 94.02 | 88.39 | 89.29 | 90.18 | 90.79 | 93.75 | 95.16 | 93.75 | 94.64 |
| QP | 40 | 41 | 42 | 43 | 44 | 45 | 46 | 47 | 48 | 49 | 50 | 51 | Aver. |
| Invention | **96.43** | **98.21** | **98.21** | **98.04** | **100** | **97.44** | 94.15 | **95.88** | **97.32** | **100** | **98.21** | **97.32** | **97.33** |
| Example 1 | 93.70 | 92.86 | 95.54 | 95.54 | 96.43 | 90.88 | **94.50** | 92.86 | 92.00 | 94.64 | 95.54 | 95.54 | 93.77 |
| Example 2 | 90.18 | 92.08 | 87.50 | 94.64 | 94.64 | 91.75 | 90.18 | 93.75 | 92.86 | 93.07 | 96.46 | 97.06 | 92.83 |
| Example 3 | 88.03 | 91.96 | 92.86 | 87.50 | 93.75 | 90.18 | 90.88 | 92.86 | 85.71 | 91.07 | 94.64 | 86.61 | 92.00 |

It can be observed that the detection method achieves consistently higher accuracies in most cases. The present method achieves the average accuracy rate of 97.33%, which is 3.56%, 4.50%, and 5.33% higher than those of Examples 1-3 respectively. When QP is selected from {10, 15, 16, 20, 44, 49}, the present method achieves the highest value of 100%. The better performance can be attributed to the fact that the present method fully exploits the double compression traces existing in the CU partition modes and intra prediction modes by increasing the exposure of the trace information through multiple encoding and decoding. Some alternative examples can achieve commendable results on AVC/HEVC double compression detection problem. However, they are not as effective as the present method when facing H.266/VVC double compression detection. It is because H.266/VVC contains more complex CU partition modes and prediction modes, and the features in these methods cannot fully characterize the trace information in H.266/VVC videos. It also can be observed that with the increase of QP, there's no significant decrease or increase in the detection accuracy. It is because double compression errors are inevitable in recompressed videos no matter how QP varies. In the multiple compression process, the coding errors would definitely lead to changes in pixel value. Advantageously, the detection feature of the present invention can effectively characterize this type of changes. Therefore, the performance of our method is satisfactory on H.266/VVC double compression detection.

Performance comparisons are made in ABR mode. Bitrate is respectively set to {2, 3, 4, 5, 6} Mbps by adjusting the option −b in VVenC. Note that, QP and rate factor cannot be fixed in this scenario because ABR mode is mutually exclusive with CQP and CRF modes. In order to obtain double compressed H.266/VVC videos, raw YUV sequences are first compressed with bitrate $B_1$. Then the generated video clips are decoded into YUV sequences, which are further recompressed with the same bitrate. Single compressed H.266/VVC video clips are defined as negative samples, while double compressed as positive samples. The invention was again compared with other three examples, the results are reported in Table 7.

TABLE 7

The detection accuracies (%) in ABR Mode

| Bitrate (Mbps) | 2 | 3 | 4 | 5 | 6 | Aver. |
|---|---|---|---|---|---|---|
| $F_{fusion}$ | 95.54 | **96.43** | **98.21** | 96.43 | **97.32** | **96.79** |
| $F_{vpar}$ | 92.40 | 89.29 | 90.82 | 91.25 | 93.93 | 91.54 |
| $F_{cpre}$ | 91.96 | 86.61 | 88.39 | 94.82 | 91.18 | 90.59 |
| Example 1 | 94.50 | 94.64 | 93.10 | 93.75 | 91.96 | 93.59 |
| Example 2 | 95.54 | 93.70 | 96.52 | **97.44** | 93.70 | 95.38 |
| Example 3 | 95.43 | 92.83 | 93.75 | 92.83 | 90.18 | 93.00 |

It can be observed from Table 7 that the system of the present invention performs well on the dataset, averaging 96.79% when bitrate is selected from {2, 3, 4, 5, 6} Mbps. The method in the present invention could achieve higher accuracies in most cases. When bitrate is set to 4 Mbps, the present method yields the highest detection accuracy of 98.21%, which is 5.11%, 1.69% and 4.46% higher than those of Examples 1-3 respectively. When bitrate is set to 5 Mbps, the present method may underperform a comparative example by 1.01%. The reason can be attributed to the slight change of the inter-frame coding mode since inter prediction modes are exploited, and the simplest Skip mode for MV prediction is used more frequently in this scenario. The present method could achieve higher accuracy. On the other hand, it can be seen from these results that the fused feature can achieve more satisfactory results than subfeatures in this scenario. This phenomenon infers that the fused feature can achieve promising results, and the subfeatures extracted from the coding process complement each other, which improves the performance of H.266/VVC double compression detection in ABR mode.

In the previous described experiments the GOP size is fixed at 10. However, in the real coding scenario, the size could be adjusted according to actual needs. Therefore, it is of great significance to evaluate the performance of the present method when videos are coded with different GOP sizes. Since VVenC is used as the encoder, the GOP size can be modified by adjusting the value of −g in the command line. In this experiment, GOP size is selected from {10, 20, 30, 40}, and the performance when QP is set to 10, 20, 30, 40, 50 may be verified respectively. By extracting CU partition and prediction modes during the decoding procedure, the feature can be constructed. Following the steps described earlier, results are shown in Table 8.

TABLE 8

The detection accuracies (%) with different GOP sizes

| GOP | | QP 10 | 20 | 30 | 40 | 50 | Aver. |
|---|---|---|---|---|---|---|---|
| 10 | Invention | **100** | **100** | **99.11** | **96.43** | **98.21** | **98.75** |
| | Example 1 | 94.64 | 98.54 | 93.88 | 93.70 | 95.54 | 95.26 |
| | Example 2 | 91.07 | 92.86 | 90.18 | 90.18 | 96.46 | 92.15 |
| | Example 3 | 90.72 | 93.75 | 94.64 | 88.03 | 94.64 | 92.36 |
| 20 | Invention | **97.25** | 95.24 | **96.43** | **95.24** | **97.32** | **96.30** |
| | Example 1 | 92.86 | 95.24 | 90.18 | 92.86 | 93.75 | 92.98 |
| | Example 2 | 90.18 | 90.18 | 88.39 | 90.83 | 93.75 | 90.67 |
| | Example 3 | 88.39 | 93.75 | 93.75 | 87.50 | 93.75 | 91.43 |
| 30 | Invention | **92.86** | **93.75** | **94.64** | **91.07** | **92.86** | **93.04** |
| | Example 1 | 90.18 | 91.07 | 88.39 | 90.18 | 89.29 | 89.82 |
| | Example 2 | 90.18 | 87.50 | 86.61 | 87.50 | 90.18 | 88.39 |
| | Example 3 | 86.61 | 91.17 | 90.18 | 86.61 | 89.29 | 88.77 |
| 40 | Invention | **89.29** | **90.18** | **92.86** | **91.07** | 87.50 | **88.18** |
| | Example 1 | 85.71 | 88.39 | 84.82 | 86.61 | 87.50 | 86.61 |
| | Example 2 | 85.71 | 86.61 | 84.82 | 85.71 | **88.39** | 86.25 |
| | Example 3 | 84.82 | 89.29 | 86.61 | 85.71 | 83.04 | 85.89 |

It may be observable from Table 8 that no matter how the GOP size varies, the detection accuracy of our method is generally above 87%. the present method achieves the highest accuracy of 100% in the cases of GOP=10, QP={10, 20}, which means all the sequences are correctly classified. With the increase of GOP size, the accuracies of these methods would decrease, but the present method maintains relatively higher values. This phenomenon can be attributed to the corresponding decrease in the number of I-frames as the GOP increases. Features in the method are mainly based on the information in I-frames. The increase of GOP size results in the insufficiency of traces in I-frames that the present method relies on. The present method also performs well when GOP=20, averaging 96.30%, which is 3.32%, 5.63%, and 4.87% higher than those of Examples 1-3 respectively. The main reason is that the coding modes including intra prediction and partition modes in H.266/VVC is somewhat different from H.265/HEVC or the previous coding standards. By exploring and constructing features compatible with the coding standard, the present method can achieve better performance.

Figures 12, 13:
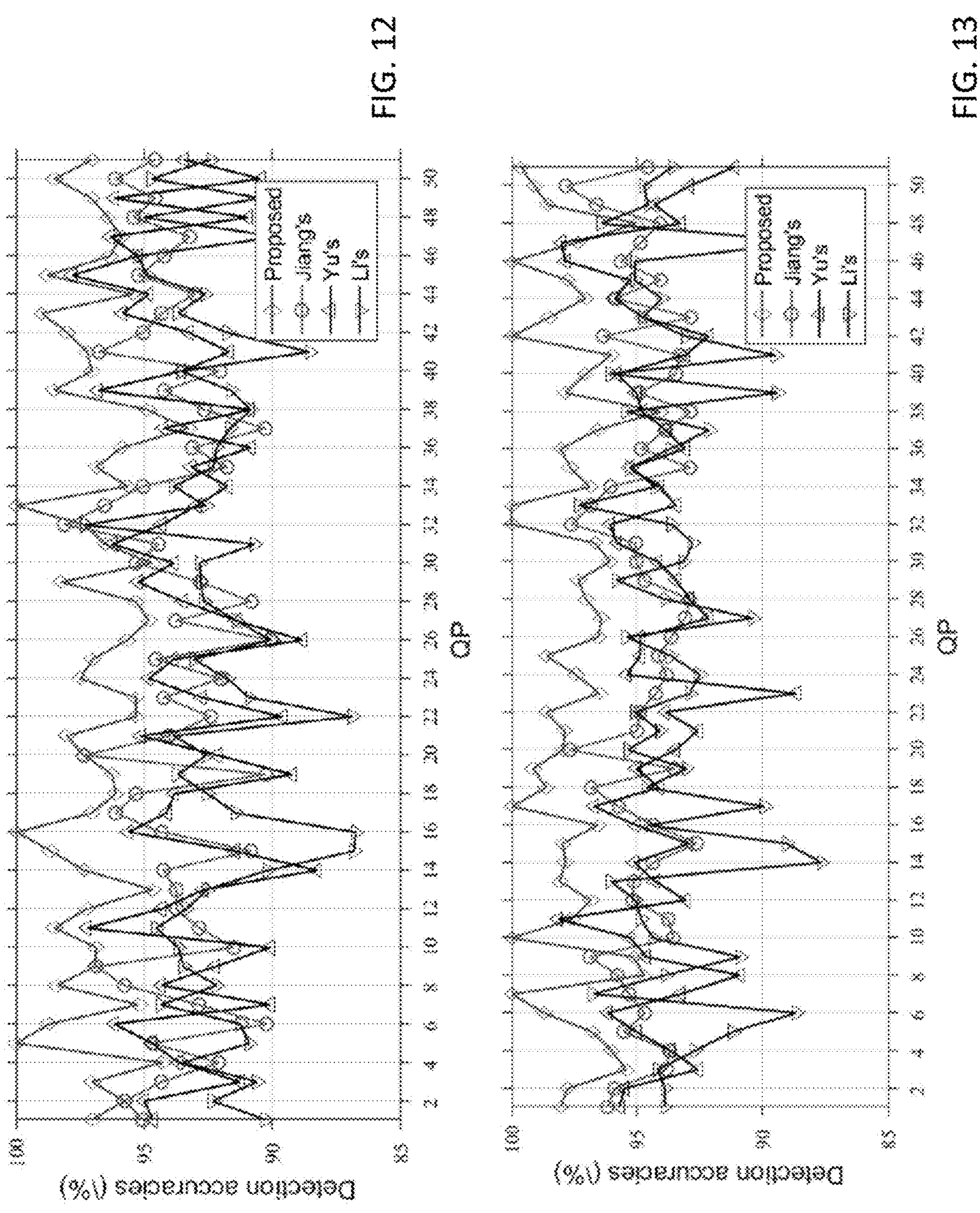
FIG. 12 is a plot showing performance evaluation on SJTU-4K Dataset.
FIG. 13 is a plot showing the detection accuracies (%) of multiple compressions detection.

The performance of the present invention was further evaluated when 4 K resolution ultra-high definition (UHD) videos are selected as the test samples. Fifteen 4 K raw YUV sequences from SJTU-4K Dataset are downloaded from public website and their names are listed below. All these sequences are larger than 200 GB in size, with YUV 4:2:0 color sampling, 8 bits per sample formats and 300 frames. The factors such as image texture, image detail, the movement speed of the object in the image, light intensity, and the camera lens stretching, panning is taken into account. All these sequences are also split into clips with a length of 100 frames to increase the sample quantity, then a total of 45 raw YUV clips can be obtained. In this experiment, VVenC and VTM are used to generate single and double compressed H.266/VVC video clips. QP is selected from {1, 2, . . . , 51}. Thus, a total of 4590 video sequences can be obtained. By performing the detection, results can be obtained, as shown in FIG. 12.

The names of the YUV sequences in SITU-4K dataset: Bund Nightscape, Campfire Party, Construction Field, Library, Fountains, Marathon, Residential Building, Runners, Rush Hour, Tall Buildings, Traffic and Building, Traffic Flow, Tree Shade, Scarf, Wood. Data in FIG. 12 shows that the present method achieves an average accuracy of 96.89%, which is 2.99, 3.54, and 4.76 percent higher than other examples. When QP is set to {5, 16, 33}, the present method achieves the highest values, and 46 of these 51 values are higher than the other three comparison examples. The results suggest that the present method could perform better than other methods in H.266/VVC double compression detection on 4 K resolution ultra-high definition (UHD) video set. This finding is understandable because the present method is based on the analysis of CU partition and prediction modes. MUM and SPM strategies were used to facilitate the feature calculation, and the variation of partition modes, together with the consistency of prediction modes are calculated for feature construction. Even though the increase of video resolution results in higher time consumption of feature extraction, it would not affect the characterization of recoding traces. In summary, these results clearly demonstrate the robustness of the present method for H.266/VVC double compression detection.

Multiple compressions of video often occur in the real scenario. In view of this, it is of great significance to evaluate the sensitivity of the present method to multiple compressions. In this experiment, the raw YUV sequences are compressed to generate a single compressed H.266/VVC videos. Then these videos are decoded and further encoded to achieve video multiple compressions. The output of each decoding is used as the input of the next coding.

This operation is repeated 3 times to generate multiple compressed videos. In this experiment, the parameters of each compression are the same, and multiple compressed videos are defined as positive samples, while single compressed videos are labeled as negative samples. Traversing QP from 1 to 51, and the results under each QP are shown in FIG. 13.

Figure 14:
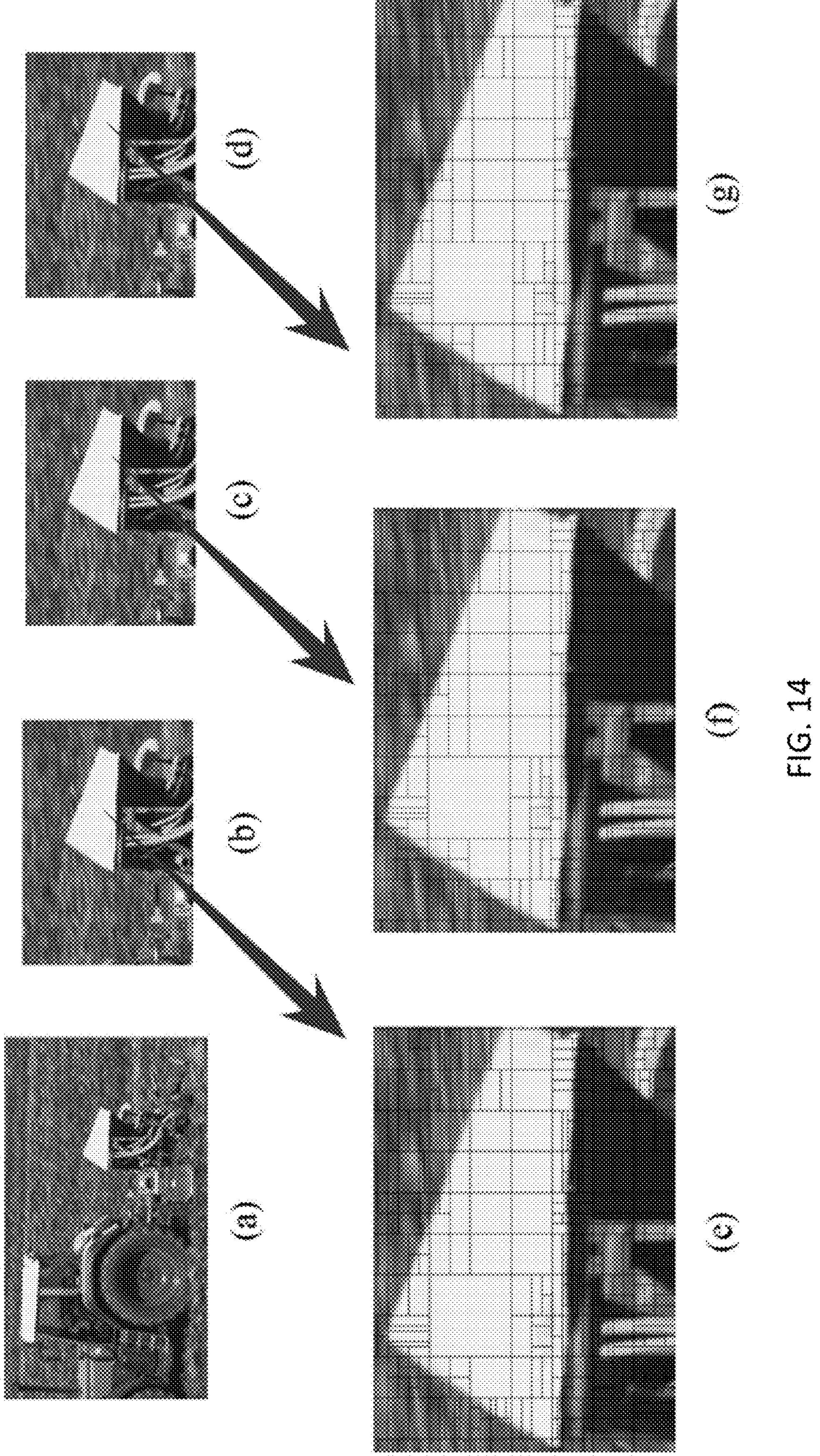
FIG. 14 are images of (a) the content of the first frame of tractor.yuv; (b-d) the partially enlarged contents after single, double and triple compressions; and (e-g) The partition modes of the partially enlarged contents in (b), (c) and (d).

As can be observed from FIG. 13, the detection accuracies of the present method are still relatively higher than the comparison methods when positive samples are multiple compressed H.266/VVC video clips. Compared with the results of double compression detection in Table 6 these comparison methods can achieve better results. For example, the average accuracies of the present method and Examples 1-3 respectively reach 97.64%, 94.82%, 94.29%, 93.44%, which are higher than the values in Table 6 The better performance can be attributed to the fact that multiple compressions would introduce more obvious compression artifacts, making the features more distinguishable. As shown in FIG. 14, consecutive encoding and decoding on tractor.yuv were performed. Subfigure (a) is the content of the first frame of the sequence; subfigures (b), (c) and (d) are the partially enlarged contents of the first frames of the single, double and triple compressed videos. It can be observed that with the compression time increases, the contents of the same frame of the videos are basically the same, and the differences cannot be detected by the naked eye. However, by analyzing their respective CU partition modes in subfigures (e), (f) and (g), it can be found that the partition modes at the same location of the frames may change due to recompression, and this variation is more likely to occur in areas with complex textures. Besides, as the compression time increases, the difference of partition modes between triple and single compressed videos are more significant than that between double and single compressed videos. Therefore, better performance can be achieved in this scenario.

Similar to the encoders of the previous coding standards, e.g., X265, X264, the H.266/VVC encoder also supports different –Preset options to optimize the trade-off between encoding speed and coding efficiency. Since VVenC is used as the encoder, vvencapp of VVenC may be used in one of five predefined presets. In the slowest preset, the encoder reaches the highest compression gain, whilst in the fastest preset the runtime is significantly decreased. To verify the effectiveness and robustness of the present method when different –Preset options are used, related experiments were performed on the dataset introduced earlier.

In this experiment, the option –Preset is selected from {faster, fast, medium, slow, slower}. Bitrate is respectively set to {2, 3, 4, 5, 6} Mbps. Other parameter settings are described earlier. Note that, the coding parameters of single and double compressed videos are consistent. The method was also compared with other examples, and the detection accuracies of these four methods are reported in Table 9.

TABLE 9

The detection accuracies (%) with different-Preset options

| Preset | | Bitrate 2 | 3 | 4 | 5 | 6 | Aver. |
|---|---|---|---|---|---|---|---|
| faster | Invention | **95.54** | **93.04** | 94.23 | **93.75** | **94.64** | **94.24** |
| | Example 1 | 91.07 | 90.18 | 87.50 | 90.18 | 88.77 | 89.54 |
| | Example 2 | 91.07 | 91.07 | **94.64** | 92.86 | 90.18 | 91.96 |
| | Example 3 | 92.86 | 89.29 | 85.71 | 88.77 | 86.25 | 88.58 |
| fast | Invention | **93.04** | 93.75 | **95.24** | **95.24** | **96.43** | **94.74** |
| | Example 1 | 92.86 | 92.86 | 91.07 | 90.18 | 91.07 | 91.61 |
| | Example 2 | 93.75 | 90.18 | 95.54 | 94.64 | 92.83 | 93.39 |
| | Example 3 | 93.75 | 93.75 | 90.18 | 89.29 | 90.18 | 91.43 |
| medium | Invention | 95.54 | **96.43** | **98.21** | 96.43 | **97.32** | **96.79** |
| | Example 1 | 94.50 | 94.64 | 93.10 | 93.75 | 91.96 | 93.59 |
| | Example 2 | 95.54 | 93.70 | 96.52 | **97.44** | 93.70 | 95.38 |
| | Example 3 | 95.43 | 92.83 | 93.75 | 92.83 | 90.18 | 93.00 |
| slow | Invention | **96.43** | **96.43** | **100** | **98.21** | **97.32** | **97.68** |
| | Example 1 | 95.54 | 93.75 | 95.54 | 96.43 | 92.86 | 94.82 |
| | Example 2 | 94.82 | 94.82 | 97.32 | 97.44 | 95.54 | 95.99 |
| | Example 3 | 96.43 | 91.17 | 94.82 | 93.04 | 89.29 | 92.95 |
| slower | Invention | **98.21** | **100** | **100** | 96.43 | **98.40** | **98.61** |
| | Example 1 | 96.43 | 95.24 | 96.43 | 97.32 | 93.75 | 95.83 |
| | Example 2 | 95.24 | 95.24 | 97.32 | **100** | 96.43 | 96.85 |
| | Example 3 | 95.24 | 96.43 | 96.43 | 93.75 | 90.18 | 94.41 |

From Table 9, it can be found that the –Preset option does have an impact on the performance of the different methods. Taking the average accuracy as an example, when –Preset is set to slower, the average accuracies of the methods reach the highest values, which are 98.61%, 95.83%, 96.85%, 94.41%, respectively. However, the methods yield the lowest accuracies of 94.24%, 89.54%, 91.96% and 88.58% when –Preset is set to faster. It is because when faster preset is adopted, the encoder takes shortcuts to improve performance at the expense of quality and compression efficiency. If a slower preset is used, the encoder will use more computations to achieve the best quality at the selected bit rate, and more detailed information is preserved in this case. It also can be observed that the present method is superior to the other three examples with different –Preset options. For example, when –Preset is set to slow, an average accuracy of 97.68% is achieved by the present method, that is +2.86%, +1.67% and +4.73% higher than those of the other examples. This comes from the fact that a series of new coding features are introduced in H.266/VVC. By leveraging CU partition and prediction modes analysis, the detection features can effectively represent the recompression trace, which lead to the better performance of the present method.

These embodiments may be advantageous in that a novel method is provided for the detection of H.266/VVC double compression with the same coding parameters. Based on the in-depth analysis of the generation of H.266/VVC double compression traces, it may be found that the quality degradation characteristic still exists in H. 266/VVC double compression. Then, the variation of CU partition and consistency of prediction modes are exploited to characterize double compression traces. In order to reduce the interference of quadtree or multi-type tree partition to mode analysis, and also to facilitate feature construction, In addition, Minimum Unit Mapping (MUM) and Subunit Prediction Mapping (SPM) are defined. The strength of the variation in the number of CUs and the consistency ratio of adjacent prediction mode pairs in the horizontal, vertical, major diagonal, and minor diagonal directions after multiple compressions on the basis of the mapped data may be calculated.

Moreover, CU partition and prediction modes based features are concatenated into a 60-D vector for the detection. Extensive experimental results demonstrate the better performance of the present method. Meanwhile, the results also confirm that the present method is robust in different coding scenarios.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilized. This will include tablet computers, wearable devices, smart phones, Internet of Things (IOT) devices, edge computing devices, stand alone computers, network computers, cloud-based computing devices and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A system for analyzing compressed video, comprising:

a processor, a memory storing instructions that, when executed by the processor, cause the processor to:

determine a variation of the partition modes and a consistency of the prediction modes;

extract coding statistics comprising partition modes and prediction modes from a compressed video sequence associated with a raw video sequence;

determine a variation of the partition modes and a consistency of the prediction modes; and determine, by processing the variation and the consistency using a trained machine-learning model, whether the compressed video has been processed by a predetermined video compression codec for multiple times using a same set of coding parameters, wherein the predetermined video compression codec includes a versatile Video Coding (H.266/VVC) compression standard.

2. The system of claim 1, wherein the machine-learning model is trained by:

obtaining multiple sets of positive samples of recompressed video sequence each represent the compressed video sequence which has been processed by the predetermined video compression codec for multiple times using the same set of coding parameters;

obtaining multiple sets of negative samples of recompressed video sequence each represent the compressed video sequence which has been processed by the predetermined video compression codec once only; and providing the multiple sets of positive samples and negative samples of recompressed video sequence so as to train the machine-learning model in a machine learning process.

3. The system of claim 2, wherein the recompressed video sequence is reprocessed by the predetermined video compression codec for at least once using the same set of coding parameters, after processing the raw video sequence with an initial compression and decompression cycle using the predetermined video compression codec and the same set of coding parameters.

4. The system of claim 2, wherein the raw video sequences decompressed video sequences obtained after at least one compression and decompression cycle include YUV sequences.

5. The system of claim 3, wherein during each decoding procedure in the compression and decompression cycle, statistics of coding unit (CU) partition and prediction modes from I-frames of the video is extracted, and wherein different CU partition modes and prediction mode statics for all coding units are labeled with a corresponding mode number.

6. The system of claim 5, wherein different CU partition modes consist of different number of 4×4 minimum units.

7. The system of claim 6, wherein during each decoding procedure after $i^{th}$ compression, minimum unit mapping and subunit prediction mapping are performed to facilitate feature construction, and wherein a difference of the number of 4×4 minimum units with the same label after two consecutive compressions is measured.

8. The system of claim 7, wherein during each decoding procedure after $i^{th}$ compression, prediction mode based feature set is further concatenated into a fusion feature for detection in the training process, wherein the prediction modes based feature set is obtained based on consistency ratios of adjacent prediction mode pairs in horizonal, vertical, major diagonal and minor diagonal directions after multiple compressions.

9. A method of analyzing compressed video, comprising the steps of:

extracting, by a processor, coding statistics comprising partition modes and prediction modes from a compressed video sequence associated with a raw video sequence;

determining, by the processor, a variation of the partition modes and a consistency of the prediction modes; and determining, by processing the variation and the consistency using a trained machine-learning model executed by the processor, whether the compressed video has been processed by a predetermined video compression codec for multiple times using a same set of coding parameters, wherein the predetermined video compression codec includes a versatile Video Coding (H.266/VVC) compression standard.

10. The method of claim 9, further comprising the step of training the machine-learning model by:

obtaining multiple sets of positive samples of recompressed video sequence each represent the compressed video sequence which has been processed by the predetermined video compression codec for multiple times using the same set of coding parameters;

obtaining multiple sets of negative samples of recompressed video sequence each represent the compressed video sequence which has been processed by the predetermined video compression codec once only; and providing the multiple sets of positive samples and negative samples of recompressed video sequence so as to train the machine-learning model in a machine learning process.

11. The method of claim 10, wherein the recompressed video sequence is reprocessed by the predetermined video compression codec for at least once using the same set of coding parameters, after processing the raw video sequence with an initial compression and decompression cycle using the predetermined video compression codec and the same set of coding parameters.

12. The method of claim 10, wherein the raw video sequences and/or a decompressed video sequence obtained after at least one compression and decompression cycle include YUV sequences.

13. The method of claim 11, wherein during each decoding procedure in the compression and decompression cycle, statistics of coding unit (CU) partition and prediction modes from I-frames of the video is extracted, and wherein different CU partition modes and prediction mode statics for all coding units are labeled with a corresponding mode number.

14. The method of claim 13, wherein different CU partition modes consist of different number of 4×4 minimum units.

15. The method of claim 14, wherein during each decoding procedure after $i^{th}$ compression, minimum unit mapping and subunit prediction mapping are performed to facilitate feature construction, and wherein a difference of the number of 4×4 minimum units with the same label after two consecutive compressions is measured.

16. The method of claim 15, wherein during each decoding procedure after $i^{th}$ compression, prediction mode based feature set is further concatenated into a fusion feature for detection in the training process, wherein the prediction modes based feature set is obtained based on consistency ratios of adjacent prediction mode pairs in horizonal, vertical, major diagonal and minor diagonal directions after multiple compressions.

* * * * *